(12) United States Patent
Mitsubori et al.

(10) Patent No.: US 7,658,107 B2
(45) Date of Patent: Feb. 9, 2010

(54) ROTATABLY SUPPORTING DEVICE FOR CORRECTING BALANCE OF ROTATING BODY

(75) Inventors: Ken Mitsubori, Tokyo (JP); Takeshi Fujimaki, Tokyo (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 544 days.

(21) Appl. No.: 10/596,398

(22) PCT Filed: Oct. 28, 2004

(86) PCT No.: PCT/JP2004/016015

§ 371 (c)(1),
(2), (4) Date: Jun. 12, 2006

(87) PCT Pub. No.: WO2005/057156

PCT Pub. Date: Jun. 23, 2005

(65) Prior Publication Data

US 2008/0282782 A1 Nov. 20, 2008

(30) Foreign Application Priority Data

Dec. 10, 2003 (JP) ............................. 2003-411203
Dec. 10, 2003 (JP) ............................. 2003-411204

(51) Int. Cl.
*G01M 1/00* (2006.01)
(52) U.S. Cl. ................................. 73/455; 73/66; 73/472
(58) Field of Classification Search ................... 73/455, 73/66, 457, 458, 460, 468, 472
See application file for complete search history.

(56) References Cited

U.S. PATENT DOCUMENTS 3,395,949 A 8/1968 Kun (Continued)

FOREIGN PATENT DOCUMENTS

JP 44-14243 6/1969

(Continued)

OTHER PUBLICATIONS

International Search Report issued in corresponding application No. PCT/JP2004/016015 completed Jan. 21, 2005 and mailed Feb. 8, 2005.

(Continued)

*Primary Examiner*—Hezron Williams
*Assistant Examiner*—Samir M Shah
(74) *Attorney, Agent, or Firm*—Griffin & Szipl, P.C.

(57) ABSTRACT

A rotatably supporting device for correcting balance of a rotating body includes a journal supporting part having a mandrel that rotatably supports the rotating body in a floating state about a vertical axis, a thrust supporting part that is provided at a lower end portion of the mandrel and supports a bottom part of the rotating body in the floating state, a first fluid supply passage that supplies a fluid for floating between the mandrel and a rotation support hole of the rotating body, an annular groove provided in the thrust supporting part so as to face the bottom part of the rotating body, and a second fluid supply passage that communicates with the annular groove to supply a fluid thereto for floating the rotating body. A rotatably supporting device for correcting balance of a rotating body includes a journal supporting part having a mandrel that rotatably supports the rotating body in a floating state about a vertical axis, a thrust supporting part that is provided at a lower end portion of the mandrel and supports a bottom part of the rotating body in the floating state, and a fluid supply passage that supplies a fluid for floating between the mandrel and a rotation support hole of the rotating body, in which a space part is formed in at least either one of the mandrel and the rotation support hole for widening a space other than at a supporting portion.

19 Claims, 12 Drawing Sheets

U.S. PATENT DOCUMENTS

| | | | | |
|---|---|---|---|---|
| 4,040,300 A | * | 8/1977 | Negard | 73/459 |
| 4,543,825 A | * | 10/1985 | Schonfeld et al. | 73/459 |
| 4,627,747 A | * | 12/1986 | Schonfeld et al. | 384/113 |
| 5,343,408 A | * | 8/1994 | Chen et al. | 700/279 |
| 6,506,031 B2 | * | 1/2003 | Sishtla | 417/366 |
| 6,616,089 B2 | * | 9/2003 | Gross et al. | 242/562 |
| 6,676,317 B2 | * | 1/2004 | Ozaki | 400/636.3 |
| 2004/0112132 A1 | * | 6/2004 | Fioravanti et al. | 73/472 |
| 2005/0235304 A1 | * | 10/2005 | Shishido | 720/701 |

FOREIGN PATENT DOCUMENTS

| | | |
|---|---|---|
| JP | 59-83028 | 5/1984 |
| JP | 63-176813 | 7/1988 |
| JP | 4-40650 | 7/1992 |
| JP | 04-327022 | 11/1992 |
| JP | 2000-074066 | 3/2000 |
| JP | 2000074066 A * | 3/2000 |
| JP | 2001-173655 | 6/2001 |

OTHER PUBLICATIONS

Korean Office Action issued in corresponding application No. KR 10-2006-7011291, issued Jul. 16, 2009.

* cited by examiner

1

ROTATABLY SUPPORTING DEVICE FOR CORRECTING BALANCE OF ROTATING BODY

This is a National Phase Application in the United States of International Patent Application No. PCT/JP2004/016015 filed Oct. 28, 2004, which claims priority on Japanese Patent Application Nos. 411203/2003 and 411204/2003, both filed Dec. 10, 2003. The entire disclosures of the above patent applications are hereby incorporated by reference.

BACKGROUND OF THE INVENTION

1. Field of the Invention

The present invention relates to a rotatably supporting device adapted for use in correcting a balance of a rotating body, which can precisely correct a balance of a heavy rotating body by rotatably supporting in a floating state by a fluid.

2. Description of Related Art

In a rotating body, for example, an impeller of a turbine, an impeller of a compressor, a fly wheel, a wheel of a vehicle or the like, in order to remove any unbalance due to a tolerance during its manufacturing or assembling or the like, a balance-correction operation is conducted by singly rotating the rotating body to measure an unbalance amount and to correct the measured amount of unbalance.

With regard to the balance correcting method of the rotating body mentioned above, patent document 1 (Japanese Examined Patent Publication No. 4-40650) proposes a balance testing machine serving as a balance correcting device which can perform a balance correction by rotating a rotating body without using an auxiliary shaft and an auxiliary spindle at a time of the balance correction even if the rotating body is not provided with a specific support part.

In the balance testing machine 1, as shown in FIGS. 1A and 1B, a vibration bridge 4 is supported on a device stand 2 via a support spring 3, and a support journal 5 serving as a mandrel for rotation support is fixed to the vibration bridge 4 in a vertical direction.

A fluid supply hole 6 having a closed upper end portion is formed in a center portion of the support journal 5, a plurality of radial outflow holes 7 are provided to lie in upper and lower flat planes in a radial direction so as to be communicated with the fluid supply hole 6, and a compressible fluid such as an air or the like is supplied thereto so as to flow out thereof.

Further, a plate 8 is integrally provided perpendicularly to a lower end portion of the support journal 5, a plurality of auxiliary holes 9 are formed in the plate 8 so as to open on an upper surface, and are communicated by an internal annular flow path 10, and the compressible fluid such as the air or the like is supplied so as to flow out of the above-mentioned holes.

In the balance testing machine 1, a rotating body 11 is mounted onto the support journal 5 by inserting a hole 12 of the rotating body 11 to the support journal 5 and the compressive fluid such as the air or the like is flown from the outflow hole 7 and the auxiliary hole 9, thereby supporting the rotating body 11 on the balance testing machine 1 in a floating state and rotating the rotating body about the support journal 5 fixed in this state so that any unbalance force transmitted to the vibration bridge 4 is measured and the balance test is performed.

In this balance testing machine, in order to stably rotate the rotating body 11 about the support journal 5, it is necessary that a gap (a floating amount) between the plate 8 and the rotating body 11 is larger than a gap between the support journal 5 and the hole 12 in the rotating body 11. If the relation is reversed, the rotating body 11 rotates on the basis of a bottom surface 13 thereof, and it is impossible to perform a necessary measurement of unbalance amount.

Accordingly, viewing a pressure distribution of the compressive fluid such as the air or the like generating the floating force and acting on a portion between the bottom surface 13 of the rotating body 11 and the plate 8, first for simplifying, as shown in a graph in the middle of FIG. 2 showing a case where the outflow of the fluid from the auxiliary hole 9 is not generated, when the floating amount of the rotating body 11 is small, an area B by the gap between the plate 8 and the bottom surface 13 of the rotating body 11 is smaller in comparison with an area A by the gap between the support journal 5 and the hole 12, an inlet portion to the area B from the area A forms a nozzle, and a negative pressure portion 14 is generated by the occurrence of rapid expansion of the compressible fluid.

Accordingly, it becomes impossible to sufficiently float the rotating body 11 due to suction by the negative pressure portion 14. Hence, if the air supply pressure is raised, as shown in a graph in the bottom of FIG. 2, the negative pressure portion 14 rapidly disappears from a state shown by a broken line to a state shown by a solid line at the moment when the area A becomes smaller than the area B, and as a result, a sudden increase in the floating force occurs while causing the rotating body 11 to bound upward.

Further, in a case where the air or the like is allowed to flow out of the auxiliary hole 9 on the plate 8, as shown by a single-dot chain line in the graph in the bottom of FIG. 2, the floating force can be increased by increasing a pressure between the plate 8 and the bottom surface 13 of the rotating body 11, however, the air flowing out of the auxiliary hole 9 tends to flow toward an outer periphery of the plate 8 having a small resistance, and the above-mentioned negative pressure portion 14 is generated in the outer peripheral side of the auxiliary hole 9, so that in a heavy or a large size rotating body 11, there occurs a problem such that it is impossible to acquire a gap by a sufficient amount of floating force.

On the other hand, there can be considered an adoption of a non-compressive fluid such as a liquid, for example, a lubricating oil or the like is used instead of the compressive fluid of the gas such as the air or the like so as to prevent the nozzle effect from being generated, whereby the support of the weight of the rotating body 11 is made easy. Nevertheless, since a viscosity and a surface tension of the non-compressive fluid of the liquid are larger in comparison with the compressive fluid of the gas such as the air or the like, a rotational resistance caused by filling in a narrow gap between the support journal 5 and the hole 12 of the rotating body 11 becomes large, and a great rotating force is necessary for obtaining a necessary balance correction rotating speed. For example, in the configuration as shown in FIGS. 1A, 1B and 2, the fluid force for rotationally driving must become excessively large and accordingly, a problem is encountered in which the rotating body 11 tends to be eccentric with respect to the support journal 5.

SUMMARY OF THE INVENTION

The present invention is made by taking into consideration the problem encountered by the prior art, and an object thereof is to provide a rotatably supporting device for use in correcting a balance of a rotating body which employs a compressive fluid or a non-compressive fluid, and is able to rotatably and stably support the rotating body in a floating state even if the rotating body is heavy.

In order to achieve the object mentioned above, in accordance with a first aspect of the present invention, there is provided a rotatably supporting device for correcting balance of a rotating body, provided in a balance correcting device measuring an unbalance force, for rotatably supporting the rotating body, comprising:

a journal supporting part having a mandrel that rotatably supports the rotating body in a floating state about a vertical axis;

a thrust supporting part that is provided at a lower end portion of the mandrel and supports a bottom part of the rotating body in the floating state;

a first fluid supply passage that supplies a fluid for floating between the mandrel and a rotation support hole of the rotating body;

an annular groove provided in the thrust supporting part so as to face the bottom part of the rotating body; and a second fluid supply passage that communicates with the annular groove to supply a fluid thereto for floating the rotating body.

In accordance with the rotatably supporting device for use in correcting the balance of the rotating body, since the rotatably supporting device is provided in the balance correcting device measuring an unbalance force in order for use in correcting the balance of the rotating body, and for rotatably supporting the rotating body for rotation, the device being configured to include the journal supporting part provided with the mandrel rotatably supporting the rotating body rotatably in the floating state about the vertical axis, the thrust supporting part rotatably supporting the bottom part of the rotating body in the floating state at the lower end portion of the mandrel, the first fluid supply passage supplying the fluid for floating between the mandrel and the rotation support hole of the rotating body, the annular groove provided in the thrust supporting part facing the bottom part of the rotating body, and the second fluid supply passage provided to be in communication with the annular groove and capable of supplying the fluid for floating the rotating body. Accordingly, the rotating body is rotatably supported by the separated journal supporting part and the thrust supporting part, and the fluid is sufficiently filled in an inner peripheral side of the annular groove by permitting the fluid to flow out of the annular groove provided in the thrust supporting part. Hence, it is possible to float the rotating body while supporting it even if the rotating body is heavy, and it is possible to stably rotate about the journal supporting part while acquiring a sufficient amount of float of the rotating body.

Further, in accordance with a second aspect of the present invention, there is provided the rotatably supporting device according to the first aspect, instead of the annular groove, comprising an annular projection portion that is provided in an outer peripheral portion of the thrust supporting part or the rotating body, and that forms a gap smaller than a gap between a lower surface of the bottom part of the rotating body and an upper surface of the thrust supporting part in the floating state of the rotating body, wherein the second fluid supply passage is provided so as to open on the thrust supporting part.

In accordance with the rotatably supporting device for correcting the balance of the rotating body, the structure is made such that the annular projection portion forming the gap smaller than the gap between the lower surface of the bottom part of the rotating body and the upper surface of the thrust supporting part is provided in the outer peripheral portion of the thrust supporting part or the rotating body in the floating state of the rotating body, instead of the annular groove, and the second fluid supply passage is provided so as to be open on the thrust supporting part. Accordingly, it is possible to sufficiently fill the fluid while preventing the fluid supplied to the thrust supporting part from the second fluid supply passage from flowing out to the outer peripheral portion, by arranging the annular projection portion in the outer peripheral portion of the thrust supporting part or the rotating body so as to form the small gap, it is possible to float the rotating body while supporting the weight thereof even if the rotating body is heavy, and it is possible to permit the rotating body to stably rotate about the journal supporting part while acquiring the sufficient floating amount.

Further, in accordance with a third aspect of the present invention, there is provided the rotatably supporting device according to the first aspect, instead of the annular groove, comprising an annular throttle portion that is provided in one of a surface of the thrust supporting part and a surface of the rotating body facing each other, and that forms a gap smaller than a gap between a lower surface of the bottom part of the rotating body and an upper surface of the thrust supporting part in the floating state of the rotating body.

In accordance with the rotatably supporting device for use in correcting the balance of the rotating body, the structure is made such that the annular throttle portion capable of forming the gap smaller than the gap between the lower surface of the bottom part of the rotating body and an upper surface of the thrust supporting part is provided in any one of a surface of the thrust supporting part and a surface of the rotating body facing each other in the floating state of the rotating body, instead of the annular groove. Accordingly, it is possible to establish a relatively large gap in an inner peripheral side of the throttle portion by arranging the annular throttle portion in any one of the facing surfaces so as to form the small gap, it is possible to sufficiently fill the fluid on the thrust supporting part while preventing the fluid from flowing out toward the outer peripheral portion, it is possible to float the rotating body while supporting the weight thereof even if the rotating body is heavy, and it is possible to allow the rotating body to stably rotate about the journal supporting part while acquiring the sufficient floating amount.

Further, in accordance with a fourth aspect of the present invention, there is provided the rotatably supporting device according to the third aspect, wherein the second fluid supply passage is provided so as to open on the thrust supporting part, in addition to providing the throttle portion.

In accordance with the rotatably supporting device for use in correcting the balance of the rotating body, the structure is made such that the throttle portion is provided, and the second fluid supply passage is provided so as to be open on the thrust supporting part. Accordingly, it is possible to more securely fill the sufficient fluid on the thrust supporting part while preventing the fluid from flowing out toward the outer peripheral portion by supplying the fluid to the inner peripheral side of the throttle portion from the second fluid supply passage, it is possible to float the rotating body while supporting the weight thereof even if the rotating body is heavy, and it is possible to permit the rotating body to stably rotate about the journal supporting part while acquiring the sufficient floating amount.

Further, in accordance with a fifth aspect of the present invention, there is provided the rotatably supporting device according to the first aspect, wherein instead of comprising the annular groove, the second fluid supply passage opens at a plurality of positions on the thrust supporting part, and a half distance between centers of the adjacent openings of the second fluid supply passage is smaller than a distance from the center of each of the openings to an open outer peripheral end of the thrust supporting part.

In accordance with the rotatably supporting device for use in correcting the balance of the rotating body, the structure is made such that a plurality of openings are provided in the second fluid supply passage to be opened on the thrust supporting part, instead of the annular groove, and the openings are provided in such a manner that the half distance between the centers of the adjacent openings becomes smaller than the distance from the center of each of the openings to the open outer peripheral end. Accordingly, it is possible to increase a flow path resistance to an outer peripheral side on the basis of an arrangement of the second fluid flow path open on the thrust supporting part so as to sufficiently fill the fluid on the thrust supporting part while preventing the fluid from flowing out toward the outer peripheral portion, it is possible to float the rotating body while supporting the weight thereof even if the rotating body is heavy, and it is possible to permit the rotating body to stably rotate about the journal supporting part while acquiring the sufficient floating amount.

Further, in accordance with a sixth aspect of the present invention, there is provided the rotatably supporting device according to the first aspect, configured to switch the fluid between a compressive fluid and a non-compressive fluid to be supplied to the first fluid supply passage and/or the second fluid supply passage.

In accordance with the rotatably supporting device for use in correcting the balance of the rotating body, the structure is made such that the device can supply the fluid supplied to the first fluid supply passage and/or the second fluid supply passage by switching to the compressive fluid and the non-compressive fluid. It is possible to limit a used amount of the lubricating oil by floating the rotating body by using the non-compressive fluid such as the lubricating oil or the like for floating it, and thereafter supplying the compressive fluid such as the air or the like, and it is possible to blow away the lubricating oil attached to the rotating body. Further, with respect to the rotating bodies having different weights, it is possible to acquire a floating amount in correspondence to the characteristics of the compressive fluid and the non-compressive fluid, by using the same mandrel.

Further, in order to achieve the object mentioned above, in accordance with a seventh aspect of the present invention, there is provided a rotatably supporting device for correcting balance of a rotating body, provided in a balance correcting device measuring an unbalance force, for rotatably supporting the rotating body, comprising:

a journal supporting part having a mandrel that rotatably supports the rotating body in a floating state about a vertical axis;

a thrust supporting part that is provided at a lower end portion of the mandrel and supports a bottom part of the rotating body in the floating state; and a fluid supply passage that supplies a fluid for floating between the mandrel and a rotation support hole of the rotating body;

wherein a space part is formed in at least either one of the mandrel and the rotation support hole for widening a space other than at a supporting portion.

In accordance with the rotatably supporting device for correcting the balance of the rotating body, in the rotatably supporting device for use in correcting the balance of the rotating body, which is provided in the balance correcting device measuring an unbalance force and rotatably supporting the rotating body, the configuration is made such that the device comprises the journal supporting part provided with the mandrel supporting the rotating body to be rotatable in the floating state about the vertical axis, the thrust supporting part configured to rotatably support the bottom part of the rotating body in the floating state at the lower end portion of the mandrel, the fluid supply passage arranged to supply the non-compressive fluid for floating between the mandrel and the rotation support hole of the rotating body, and the space part arranged in at least either one of the mandrel and the rotation support hole for widening a space other than a space at a supporting portion thereof. Accordingly, the rotating body is rotatably supported by the separated journal supporting part and the thrust supporting part, the non-compressive fluid from the fluid supply passage is delivered out toward the thrust supporting part, it is possible to float the rotating body while supporting it even if the rotating body is heavy, the space part is provided in the journal supporting part except the supporting portion so as to apply the non-compressive fluid supplied from the fluid supply passage only to the supporting portion for rotatably supporting the rotating body, it is possible to secure the sufficient floating amount, and it is possible to permit the rotating body to stably rotate while preventing an eccentricity while increasing a rigidity in the journal supporting part.

Further, in accordance with an eighth aspect of the present invention, there is provided the rotatably supporting device according to the seventh aspect, wherein a second fluid supply passage is provided for supplying the non-compressive fluid for floating the rotating body to the thrust supporting part facing the bottom part of the rotating body.

In accordance with the rotatably supporting device for use in correcting the balance of the rotating body, the configuration is made such that the second fluid supply passage is provided for supplying the non-compressive fluid for floating the rotating body to the thrust supporting part facing the bottom part of the rotating body.

Accordingly, it is possible to more securely supply the non-compressive fluid to the thrust supporting part, and it is possible to stably rotate while increasing the rigidity in the journal supporting part so as to prevent the eccentricity.

Further, in accordance with a ninth aspect of the present invention, there is provided the rotatably supporting device according to the seventh aspect, wherein a discharge path communicated with the space part is provided for discharging the inside non-compressive fluid.

In accordance with the rotatably supporting device for use in correcting the balance of the rotating body, the configuration is made such that the device is provided with a discharge path communicated with the space part so as to discharge the non-compressive fluid from inside.

Accordingly, it is possible to further apply the non-compressive fluid only to the supporting portion for rotatably supporting, by discharging the non-compressive fluid within the space part from the discharge path, and it is possible to stably rotate while increasing the rigidity in the journal supporting part so as to prevent the eccentricity.

Further, in accordance with a tenth aspect of the present invention, there is provided the rotatably supporting device according the seventh aspect, wherein for discharging the non-compressive fluid, a second discharge path is provided to open upward on a topmost supporting portion between the mandrel and the rotation support hole of the rotating body.

In accordance with the rotatably supporting device for use in correcting the balance of the rotating body, the configuration is made such that the second discharge path is provided to be opened upward on the topmost supporting portion between the mandrel and the rotation support hole of the rotating body for discharging the non-compressive fluid therefrom. Accordingly, it is possible to discharge the non-compressive fluid flowing out to the upper side of the topmost supporting portion from the second discharge path, it is possible to discharge the non-compressive fluid even in the case that the rotation support hole of the rotating body has a bottom and does not penetrate, and it is possible to prevent the scattering and the leaking so as to correct the balance in the case that it penetrates.

Further, in accordance with an eleventh aspect of the present invention, there is provided the rotatably supporting device according to the ninth or tenth aspect, wherein discharge means for forcibly discharging the non-compressive fluid is provided at the discharge path and/or the second discharge path.

In accordance with the rotatably supporting device for use in correcting the balance of the rotating body, the configuration is made such that the discharge means for forcibly discharging the non-compressive fluid is provided at the discharge path and/or the second discharge path. Accordingly, it is possible to supply the non-compressive fluid only to the necessary portion so as to rotatably support by arranging the discharge means at the discharge path and the second discharge path so as to forcibly discharge the non-compressive fluid, and it is possible to correct the balance while preventing the scattering and the leaking.

Further, in accordance with a twelfth aspect of the present invention, there is provided the rotatably supporting device according to the seventh, wherein recovery means for recovering the non-compressive fluid is provided at a position confronting an outer periphery of the thrust supporting part.

In accordance with the rotatably supporting device for use in correcting the balance of the rotating body, the configuration is made such that the recovery means for recovering the non-compressive fluid is provided so as to face the outer periphery of the thrust supporting part. Accordingly, it is possible to recover the non-compressive fluid from the thrust supporting part by the recovery means, and it is possible to correct the balance while preventing the scattering and the leaking.

Further, in accordance with a thirteenth aspect of the present invention, there is provided the rotatably supporting device according to the seventh, wherein an annular projection portion is provided between the thrust supporting part and the rotating body, for holding the non-compressive fluid.

In accordance with the rotatably supporting device for use in correcting the balance of the rotating body, the configuration is made such that the annular projection portion holding the non-compressive fluid is provided between the thrust supporting part and the rotating body. Accordingly, it is possible to more securely hold the non-compressive fluid on the thrust supporting part, and it is possible to correct the balance while floating the rotating body even if the rotating body is heavy.

Further, in accordance with a fourteenth aspect of the present invention, there is provided the rotatably supporting device according to the seventh, wherein an annular groove is provided in a front end portion of the fluid supply passage of the journal supporting part.

In accordance with the rotatably supporting device for use in correcting the balance of the rotating body, the configuration is made such that the annular groove is provided in the leading end portion of the fluid supply passage of the journal supporting part. It is possible to permit the non-compressive fluid to discharge toward an entire periphery of the journal supporting part from the annular groove, and it is possible to correct the balance by rotating about the journal supporting part while more securely preventing the eccentricity or the like.

As mentioned above, in accordance with the rotatably supporting device for use in correcting the balance of the rotating body described in the first aspect of the present invention, in the rotatably supporting device for correcting the balance of the rotating body, which is provided in the balance correcting device measuring an unbalance force and rotatably supporting the rotating body, since the configuration is made such that the device comprises the journal supporting part provided with the mandrel rotatably supporting the rotating body in the floating state about the vertical axis, the thrust supporting part rotatably supporting the bottom part of the rotating body in the floating state is provided in the lower end portion of the mandrel, the first fluid supply passage supplying the fluid for floating is provided between the mandrel and the rotation support hole of the rotating body, the annular groove is provided in the thrust supporting part facing the bottom part of the rotating body, and the second fluid supply passage supplying the fluid for floating the rotating body is provided so as to be communicated with the annular groove, the rotating body is rotatably supported by the separated journal supporting part and the thrust supporting part, it is possible to sufficiently fill the fluid in the inner peripheral side of the annular groove by permitting the fluid discharge from the annular groove provided in the thrust supporting part, it is possible to float the rotating body while supporting it even if the rotating body is heavy, and it is possible to correct the balance by stably rotating along the journal supporting part while securing a sufficient floating amount.

Further, in accordance with the rotatably supporting device for use in correcting the balance of the rotating body described in the second aspect of the present invention, since the configuration is made such that the annular projection portion forming the smaller gap than the gap between the lower surface of the bottom part of the rotating body and the upper surface of the thrust supporting part is provided in the outer peripheral portion of the thrust supporting part or the rotating body, instead of the annular groove, and the second fluid supply passage is provided so as to be open on the thrust supporting part, it is possible to arrange the annular projection portion in the outer peripheral portion of the thrust supporting part or the rotating body so as to form the small gap, it is possible to sufficiently fill the fluid while preventing the fluid supplied to the thrust supporting part from the second fluid supply passage from flowing out to the outer peripheral portion, and it is possible to stably rotate along the journal supporting part while securing the sufficient floating amount, by floating the rotating body while supporting the weight thereof even if the rotating body is heavy.

Further, in accordance with the rotatably supporting device for use in correcting the balance of the rotating body described in the third aspect of the present invention, since the configuration is made such that the annular throttle portion forming the smaller gap than the gap between the lower surface of the bottom part of the rotating body and an upper surface of the thrust supporting part is provided in any one of facing surfaces to the thrust supporting part or the rotating body, instead of the annular groove, it is possible to secure a relatively large gap in an inner peripheral side of the throttle portion by arranging the annular throttle portion in any one of the surface of the thrust supporting part and the surface of the rotating body facing each other so as to form the small gap, it is possible to float the rotating body while supporting the weight thereof even if the rotating body is heavy, by sufficiently filling the fluid on the thrust supporting part while preventing the fluid from flowing out to the outer peripheral portion, and it is possible to correct the balance by stably rotating along the journal supporting part while securing the sufficient floating amount.

Further, in accordance with the rotatably supporting device for use in correcting the balance of the rotating body described in the fourth aspect of the present invention, since the configuration is made such that the throttle portion is provided, and the second fluid supply passage is provided so as to be open on the thrust supporting part, it is possible to prevent the fluid from flowing out to the outer peripheral portion by supplying the fluid to the inner peripheral side of the throttle portion from the second fluid supply passage, it is possible to more securely fill the sufficient fluid on the thrust supporting part, it is possible to float the rotating body while supporting the weight thereof even if the rotating body is heavy, and it is possible to correct the balance by stably rotating along the journal supporting part while securing the sufficient floating amount.

Further, in accordance with the rotatably supporting device for use in correcting the balance of the rotating body described in the fifth aspect of the present invention, since the configuration is made such that a plurality of openings are provided in the second fluid supply passage open on the thrust supporting part, instead of the annular groove, and the openings are provided in such a manner that the distance between the adjacent opening centers becomes smaller than the half distance from each of the opening centers to the outer peripheral opening end, it is possible to sufficiently fill the fluid in the thrust supporting part by increasing a flow path resistance to an outer peripheral side on the basis of an arrangement of the second fluid flow path open on the thrust supporting part while preventing the fluid from flowing out to the outer peripheral portion, it is possible to correct the balance by stably rotating along the journal supporting part while securing the sufficient floating amount by floating the rotating body while supporting the weight thereof even if the rotating body is heavy.

Further, in accordance with the rotatably supporting device for use in correcting the balance of the rotating body described in the sixth aspect of the present invention, since the configuration is made such that the device can supply the fluid supplied to the first fluid supply passage and/or the second fluid supply passage by switching to the compressive fluid and the non-compressive fluid, it is possible to limit a used amount of the lubricating oil by floating the rotating body by using the non-compressive fluid such as the lubricating oil or the like for floating the rotating body, and thereafter supplying the compressive fluid such as the air or the like, and it is possible to blow away the lubricating oil attached to the rotating body so as to perform cleaning. Further, with respect to the rotating bodies having different weights, it is possible to secure a floating amount in correspondence to the characteristics of the compressive fluid and the non-compressive fluid, by using the same mandrel.

Further, in accordance with the rotatably supporting device for use in correcting the balance of the rotating body described in the seventh aspect of the present invention, in the rotatably supporting device for correcting the balance of the rotating body, which is provided in the balance correcting device measuring an unbalance force and rotatably supporting the rotating body, since the configuration is made such that the device comprises the journal supporting part provided with the mandrel rotatably supporting the rotating body in the floating state around the vertical axis, the thrust supporting part rotatably supporting the bottom part of the rotating body in the floating state is provided in the lower end portion of the mandrel, the fluid supply passage is provided for supplying the non-compressive fluid for floating between the mandrel and the rotation support hole of the rotating body, and the space part widening a space other than at the supporting portion is provided in at least any one of the mandrel and the rotation support hole, the rotating body is rotatably supported by the separated journal supporting part and the thrust supporting part, the non-compressive fluid from the fluid supply passage is let out to the thrust supporting part, it is possible to float the rotating body while supporting it even if the rotating body is heavy, it is possible to secure the sufficient floating amount by arranging the space part in the journal supporting part except the supporting portion so as to apply the non-compressive fluid supplied from the fluid supply passage only to the supporting portion for rotatably supporting it, and it is possible to stably rotate while preventing an eccentricity while increasing a rigidity in the journal supporting part.

Further, in accordance with the rotatably supporting device for use in correcting the balance of the rotating body described in the eighth aspect of the present invention, since the configuration is made such that the second fluid supply passage supplying the non-compressive fluid for floating the rotating body is provided in the thrust supporting part facing to the bottom part of the rotating body, it is possible to more securely supply the non-compressive fluid to the thrust supporting part, and it is possible to stably rotate while increasing the rigidity in the journal supporting part so as to prevent the eccentricity.

Further, in accordance with the rotatably supporting device for use in correcting the balance of the rotating body described in the ninth aspect of the present invention, since the configuration is made such that the device is provided with a discharge portion communicated with the space part so as to discharge the non-compressive fluid in an inner portion thereof, it is possible to further apply the non-compressive fluid only to the supporting portion for rotatably supporting it, by discharging the non-compressive fluid in the space part from the discharge path, and it is possible to stably rotate it while increasing the rigidity in the journal supporting part so as to prevent the eccentricity.

Further, in accordance with the rotatably supporting device for use in correcting the balance of the rotating body described in the tenth aspect of the present invention, since the configuration is made such that the second discharge path discharging the non-compressive fluid is provided so as to be open upward on the topmost supporting portion between the mandrel and the rotation support hole, it is possible to discharge the non-compressive fluid flowing out to the upper side of the topmost supporting portion from the second discharge path, it is possible to discharge the non-compressive fluid even in the case that the rotation support hole of the rotating body has a bottom and does not penetrate, and it is possible to prevent the scattering and the leaking so as to correct the balance in the case that it penetrates.

Further, in accordance with the rotatably supporting device for use in correcting the balance of the rotating body described in the eleventh aspect of the present invention, since the configuration is made such that the discharge means for forcibly discharging the non-compressive fluid is provided at the discharge path and/or the second discharge path, it is possible to supply the non-compressive fluid only to the necessary portion so as to rotatably support by arranging the discharge means at the discharge path and the second discharge path so as to forcibly discharge the non-compressive fluid, and it is possible to correct the balance while preventing the scattering and the leaking.

Further, in accordance with the rotatably supporting device for use in correcting the balance of the rotating body described in the twelfth aspect of the present invention, since the configuration is made such that the recovery means for recovering the non-compressive fluid is provided so as to face to the outer periphery of the thrust supporting part, it is possible to recover the non-compressive fluid from the thrust supporting part by the recovery means, and it is possible to correct the balance while preventing the scattering and the leaking.

Further, in accordance with the rotatably supporting device for use in correcting the balance of the rotating body described in the thirteenth aspect of the present invention, since the configuration is made such that the annular projection portion holding the non-compressive fluid is provided between the thrust supporting part and the rotating body, it is possible to more securely hold the non-compressive fluid on the thrust supporting part, and it is possible to correct the balance while securely floating the rotating body even if the rotating body is heavy.

Further, in accordance with the rotatably supporting device for use in correcting the balance of the rotating body described in the fourteenth aspect of the present invention, since the configuration is made such that the annular groove is provided in the leading end portion of the second fluid supply passage of the journal supporting part, it is possible to let out the non-compressive fluid to an entire periphery of the journal supporting part from the annular groove, and it is possible to correct the balance by more securely rotating along the journal supporting part while preventing the eccentricity or the like.

The other objects and advantageous features of the present invention will be more apparent from the following description with reference to the accompanying drawings.

DESCRIPTION OF PREFERABLE EMBODIMENTS

A description will be in given below in detail of embodiments in accordance with the present invention with reference to the accompanying drawings.

Figure 3:
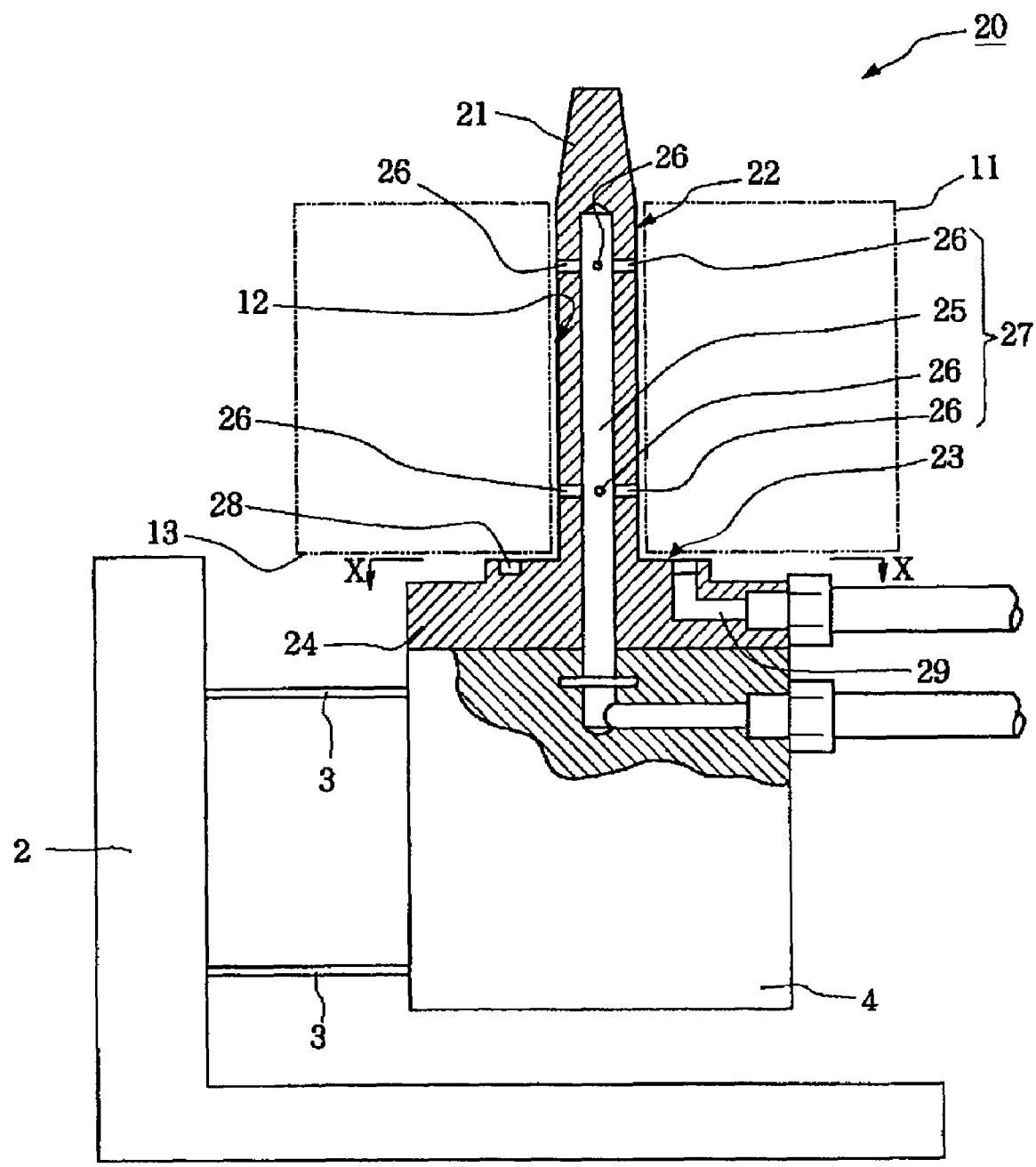
FIG. 3 is partially cut schematic view showing a part in accordance with an embodiment of a rotatably supporting device for correcting a balance of a rotating body of the present invention.
Figure 4:
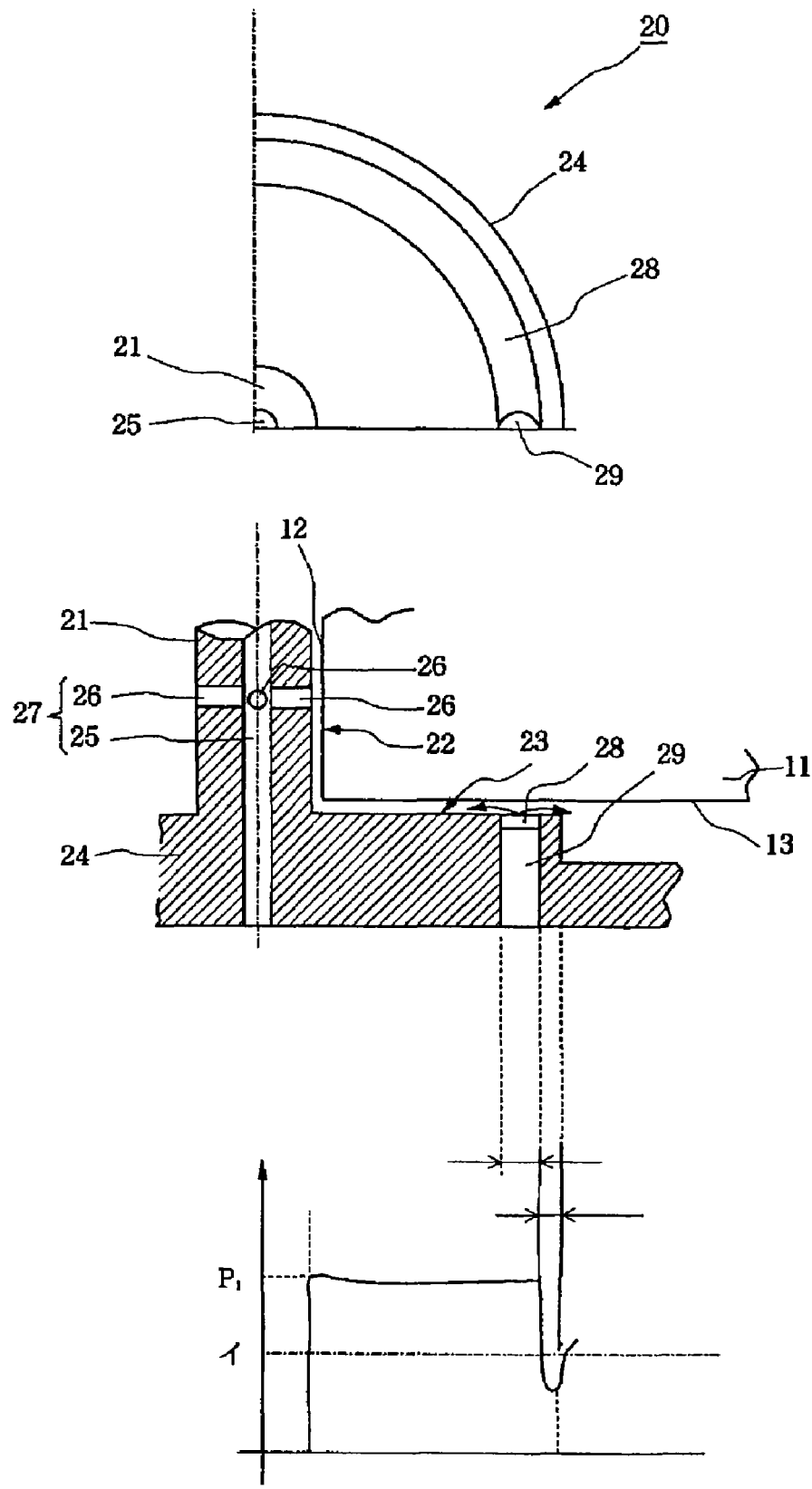
FIG. 4 shows an embodiment of the rotatably supporting device for correcting the balance of the rotating body in accordance with the present invention, in which a top portion in FIG. 4 is a view as seen from an arrow X-X in FIG. 3, a middle portion in FIG. 4 is a partly enlarged sectional view, and a bottom part in FIG. 4 is an explanatory view of a pressure distribution.

FIGS. 3 and 4 relate to an embodiment of a rotatably supporting device for correcting a balance of a rotating body in accordance with the present invention, in which FIG. 3 is a partially cut schematic view, a top portion in FIG. 4 is a view as seen from an arrow X-X in FIG. 3, a middle portion in FIG. 4 is a partly enlarged cross sectional view, and a bottom part in FIG. 4 is an explanatory view of a pressure distribution.

Figure 1A:
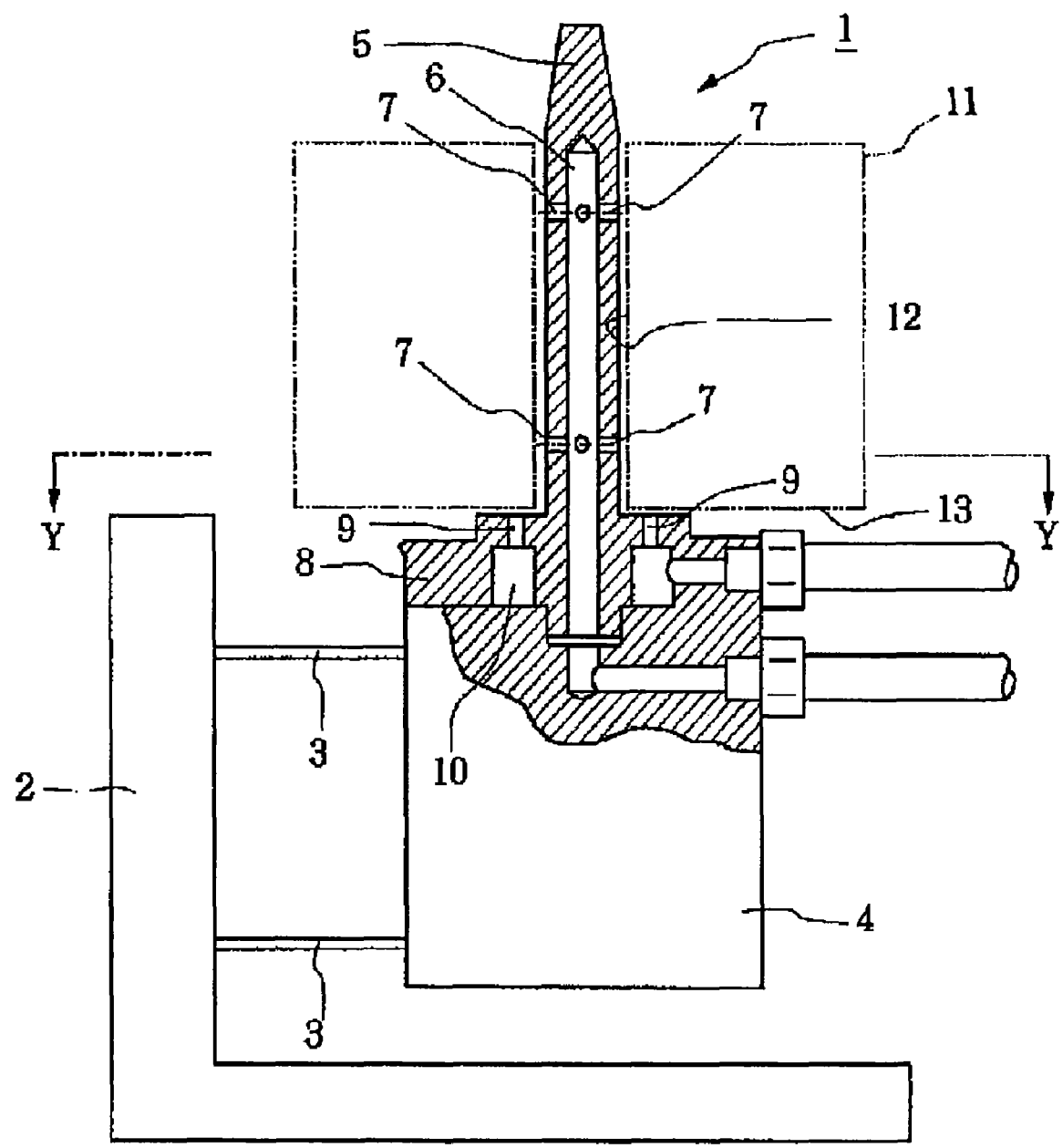
FIG. 1A is a partially cut sectional view of a conventional balance testing machine of a rotating body.
Figure 1B:
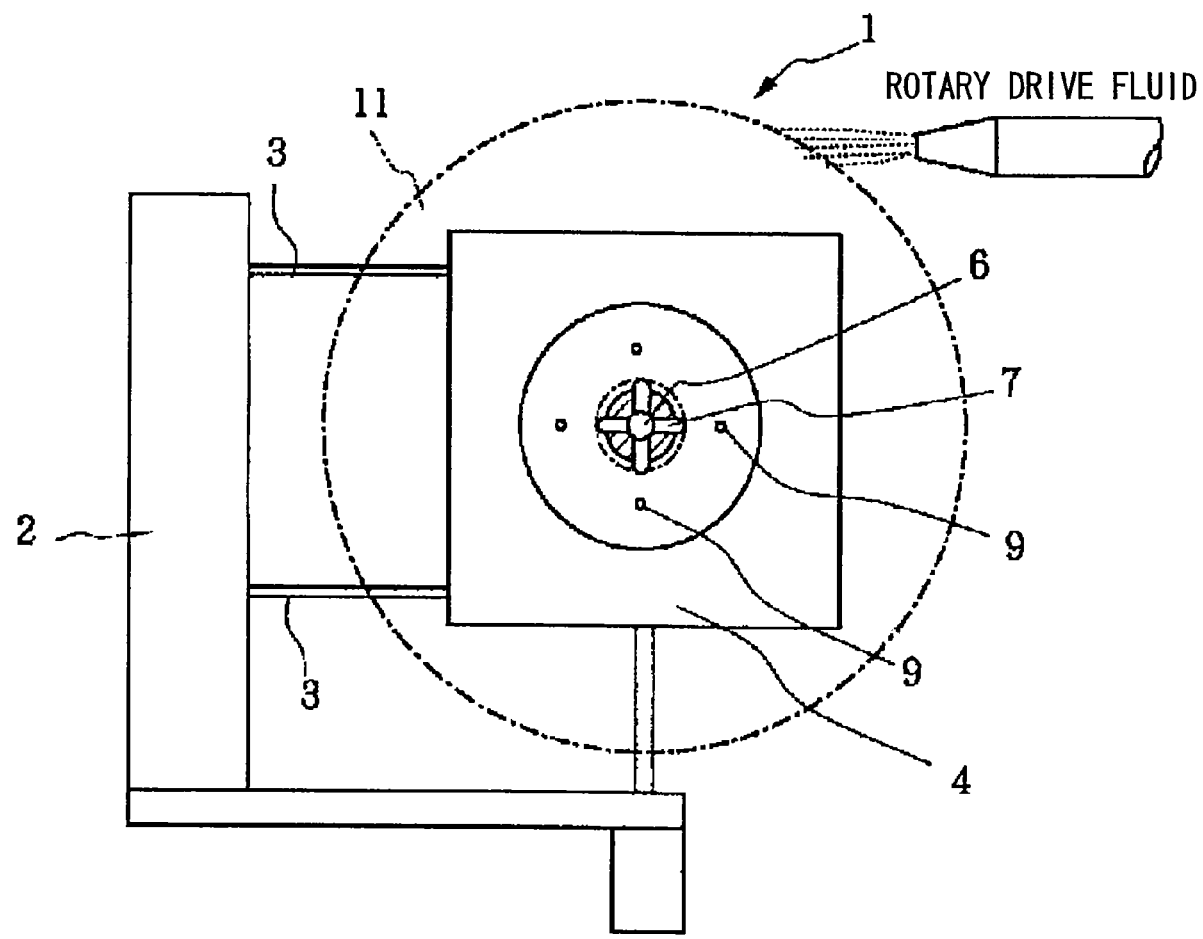
FIG. 1B is a view as seen from an arrow Y-Y of FIG. 1A.
Figure 2:
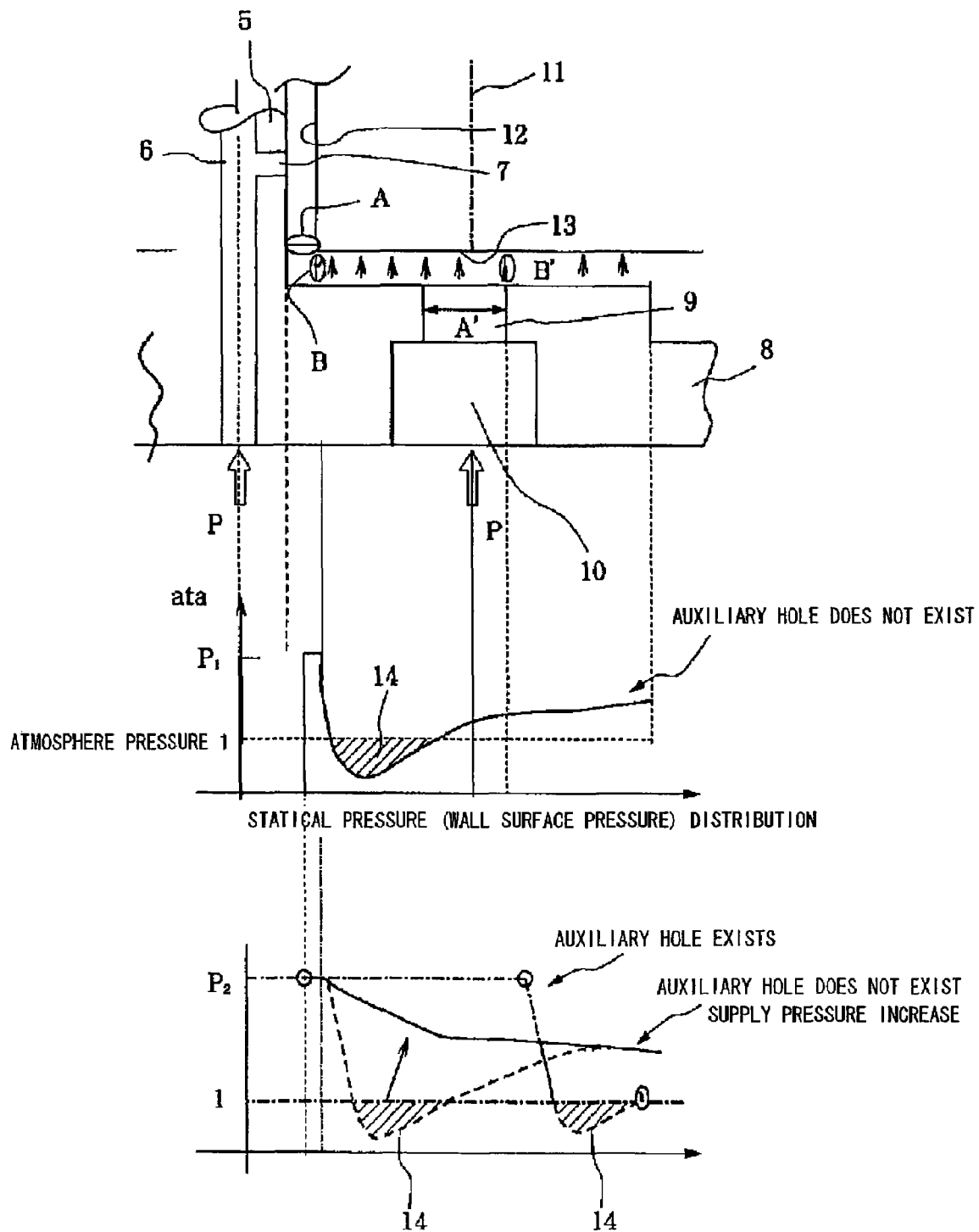
FIG. 2 is an explanatory view of a pressure distribution in the conventional balance testing machine of the rotating body.

A rotatably supporting device 20 for correcting a balance of a rotating body (hereinafter, refer simply to as a rotatably supporting device 20) corresponds to a rotatably supporting device for correcting a balance which is provided in a balance correcting device measuring an unbalance force and rotating the rotating body while rotatably supporting, which is provided, for example, instead of a support journal 5 and a plate 8 provided in a vibration bridge 4 of the balance correcting device 1 described in FIGS. 1A and 1B, thereby rotatably supporting a rotating body 11 in a floating state even if the rotating body 11 is heavy or large.

The rotatably supporting device 20 is provided with a journal supporting part 22 having a mandrel 21 rotatably supporting the rotating body 11 around a vertical axis in a floating state, a lower end portion of the mandrel 21 is integrally provided with a disc-shaped plate 24 constituting a thrust supporting part 23 rotatably supporting a bottom part 13 of the rotating body 11 in a floating state, and the plate 24 is fixed to the vibration bridge 4.

In the rotatably supporting device 20, as the journal supporting part 22 rotatably supporting the rotating body 11 about the vertical axis while installing a rotation support hole 12 of the rotating body 11 to the mandrel 21, a first fluid supply passage 27 is formed by a center flow path 25 supplying a fluid for floating to a center portion of the mandrel 21, and a plurality of outflow holes 26 being provided horizontally at two upper and lower positions of the center flow path 25 and being open on an outer periphery of the mandrel 21.

A fluid, for example, a compressed air is supplied to the first fluid supply passage 27, and is supplied from a lower end portion of the center flow path 25.

Accordingly, if the compressed air supplied to the first fluid supply passage 27 is supplied to the journal portion between the mandrel 21 and the rotation support hole 12 of the rotating body 11 by letting out the compressed air from the outflow holes 26 via the center flow path 25, the rotating body 11 is supported so as to be rotatable around the vertical axis in a non-contact state with the mandrel 21 via a slight gap on the basis of the pressure of the compressed air.

Further, in the rotatably supporting device 20, in order to rotatably support the rotating body 11 in a thrust direction, an annular groove 28 is provided in the vicinity of an outer peripheral edge of the plate 24 of the thrust supporting part 23 facing to the bottom part 13 of the rotating body 11, and a second fluid supply passage 29 supplying the fluid for floating the rotating body is provided so as to be communicated with the annular groove 28.

Further, the fluid, for example, the compressed air is supplied to the second fluid supply passage 29. In this case, the second fluid supply passage 29 is not limited to the case that the second fluid supply passage 29 is provided at one position of the annular groove 28, as in an illustrated embodiment, but it is preferable that the second fluid supply passage 29 is provided at a plurality of positions on a circumference so as to supply the fluid, thereby letting out the fluid at a uniform pressure in each of the portions of the annular grooves 28.

In the rotatably supporting device 20 structured as mentioned above, the rotating body 11 is installed so as to insert the rotation support hole 12 of the rotating body 11 to the mandrel 21 of the journal supporting part 22.

Further, the rotation support part 12 of the rotating body 11 is supported in the floating state with respect to the mandrel 21 in the fixed state, by supplying the compressed air serving as the fluid to the first fluid supply passage 27, and letting out the fluid from the upper and lower outflow holes 26 of the mandrel 21 via the center flow path 25.

In the same manner, the rotating body 11 is supported in the floating state by supplying the compressed air serving as the fluid to the second fluid supply passage 29 of the thrust supporting part 23, letting out the fluid from the annular groove 28 open on the upper surface of the plate 24 and holding the compressed air between the upper surface of the plate 24 and the bottom part 13 of the rotating body 11.

It is possible to measure an unbalance force transmitted to the vibration bridge 4 so as to execute a balance test, by rotating the rotating body 11 in this state.

In the rotatably supporting device 20 mentioned above, as the pressure distribution in the case of using the compressive fluid is shown in the bottom part in FIG. 4, since the structure is made such that the annular groove 28 open on the outer peripheral portion of the plate 24 of the thrust supporting part 23 is formed, and the fluid is let out to the portion between the bottom part 13 of the rotating body 11 and the plate 24 from the annular groove 28, the fluid flowing out from the inner peripheral edge of the annular groove 28 and the fluid flowing out from the outflow hole 26 of the journal supporting part 22 are held in the inner peripheral side of the annular groove 28, and it is possible to secure the pressure necessary for floating the rotating body 11.

On the other hand, the compressive fluid flowing out to the outer peripheral side of the annular groove 28 is expanded on the basis of a nozzle effect in an outer peripheral end of the plate 24 and the negative pressure portion 14 is generated in a slight region. However, since the area facing to the bottom part 13 of the rotating body 11 is small, it is possible to float the rotating body 11 with hardly affected by the area even if the rotating body 11 is heavy, it is possible to float more widely than the gap between the mandrel 21 of the journal supporting part 22 and the rotation support part 12 of the rotating body 11, it is possible to rotate the rotating body 11 along the mandrel 21, and it is possible to measure a correct unbalance amount.

In other words, in the rotatably supporting device 20, the structure is made such that the sufficient floating amount is secured with respect to the heavy rotating body 11, by holding the fluid by the fluid flowing into the portion between the plate 24 of the thrust supporting part 23 and the bottom part 13 of the rotating body 11 from the first fluid supply passage 27, and the fluid flowing out from the annular groove 28 of the second fluid supply passage 29 so as to secure the pressure.

Accordingly, it is possible to prevent the rotating body 11 from rotating on the plate 24 on the basis of the bottom part 13 of the rotating body 11, it is possible to rotate the rotating body 11 in a state in which geometric axes of the rotation support part 12 of the rotating body 11 and the outer periphery of the mandrel 21 coincide with each other at a sufficient precision, and it is possible to obtain a right balance correcting precision.

Figure 5:
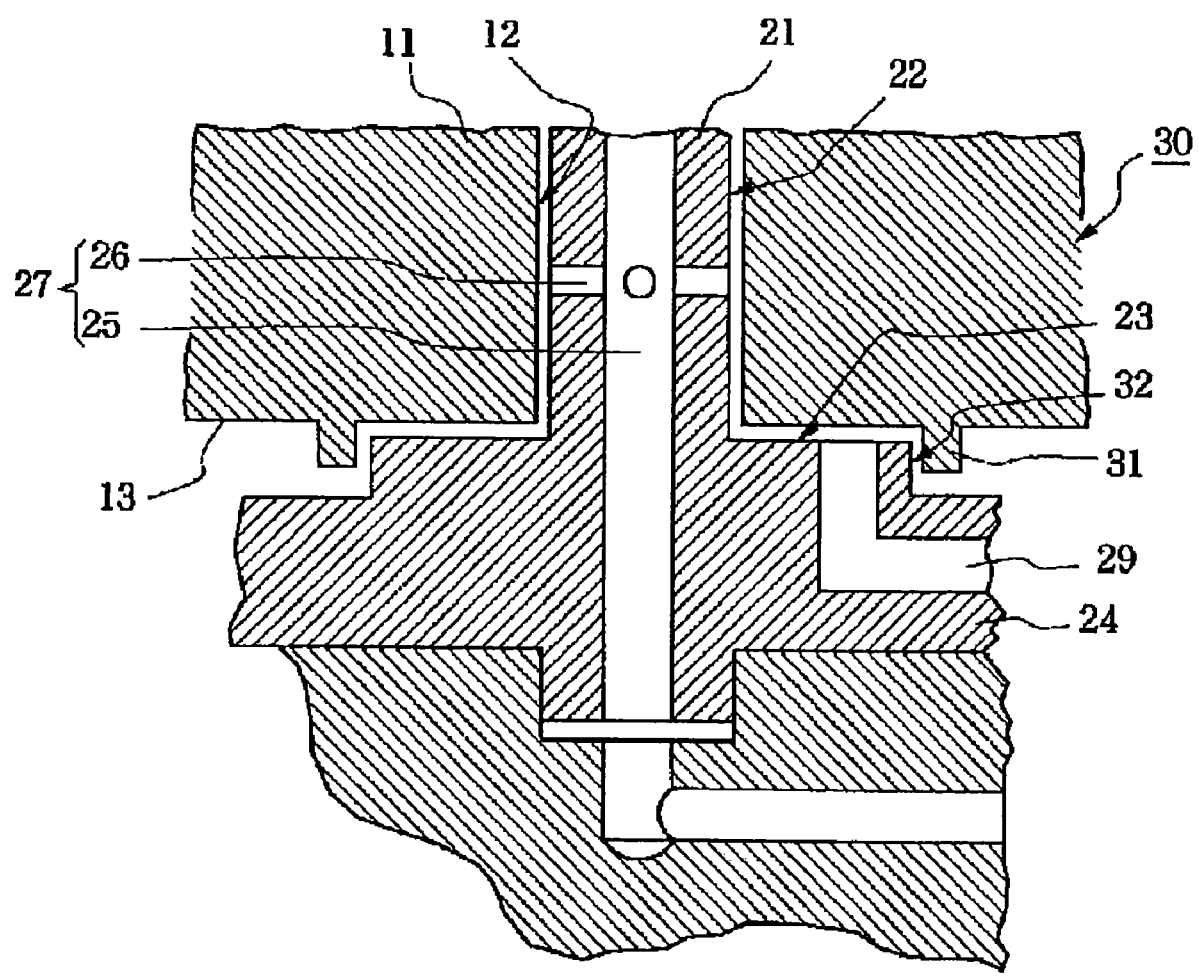
FIG. 5 is an enlarged sectional view of an embodiment of the rotatably supporting device for correcting the balance of the rotating body in accordance with the present invention.

Next, a description will be given of another embodiment in accordance with the present invention with reference to FIG. 5.

In a rotatably supporting device 30, in order to hold the fluid between the plate 24 of the thrust supporting part 23 and the bottom part 13 of the rotating body 11 so as to secure the pressure, an annular protruding portion 31 is formed as a dam protruding toward an outer peripheral portion of the plate 24 from the bottom part 13 of the rotating body 11, instead of the annular groove, and a gap 32 between the protruding portion 31 and the outer peripheral portion of the plate 24 is made small, whereby the fluid is prevented from flowing out from the outer peripheral end portion of the plate 24.

Further, in the rotatably supporting device 30, a second fluid supply passage 29 is provided so as to be open on an upper surface of the plate 24, and the fluid is let out to the portion between the plate 24 and the bottom part 13 of the rotating body 11.

In this case, the other structures of the rotatably supporting device 30 are the same as those of the rotatably supporting device 20, which has been already described.

In accordance with the rotatably supporting device 30 structured in the manner mentioned above, the fluid is let out to the portion between the bottom part 13 of the rotating body 11 and the plate 24 from the second fluid supply passage 29, the outflow fluid is held by the small gap 32 in the projection portion 31 forming the annular dam, and the fluid flowing out from the outflow hole 26 of the journal supporting part 22 is held between the bottom part 13 of the rotating body 11 and the plate 24, whereby it is possible to secure the pressure necessary for floating the rotating body 11.

In the case that the fluid from the journal supporting part 22 is constituted by the air, a nozzle effect is generated when the compressed air flows into the gap of the plate 24 before the rotating body 11 floats. However, the gap is closed by the annular projection portion 31, and the negative pressure is generated for a very short time. Accordingly, the negative pressure hardly affects the floating of the rotating body 11. Further, the negative pressure is generated by the nozzle effect in an outer peripheral end of the plate 24. However, the area facing to the bottom part 13 of the rotating body 11 is very small, and is hardly affected thereby.

Accordingly, it is possible to float the rotating body 11 even if the rotating body 11 is heavy, it is possible to float the rotating body 11 more widely than the gap between the mandrel 21 of the journal supporting part 22 and the rotation support part 12 of the rotating body 11, it is possible to rotate the rotating body 11 along the mandrel 21, and it is possible to measure a correct unbalance amount.

Figure 6:
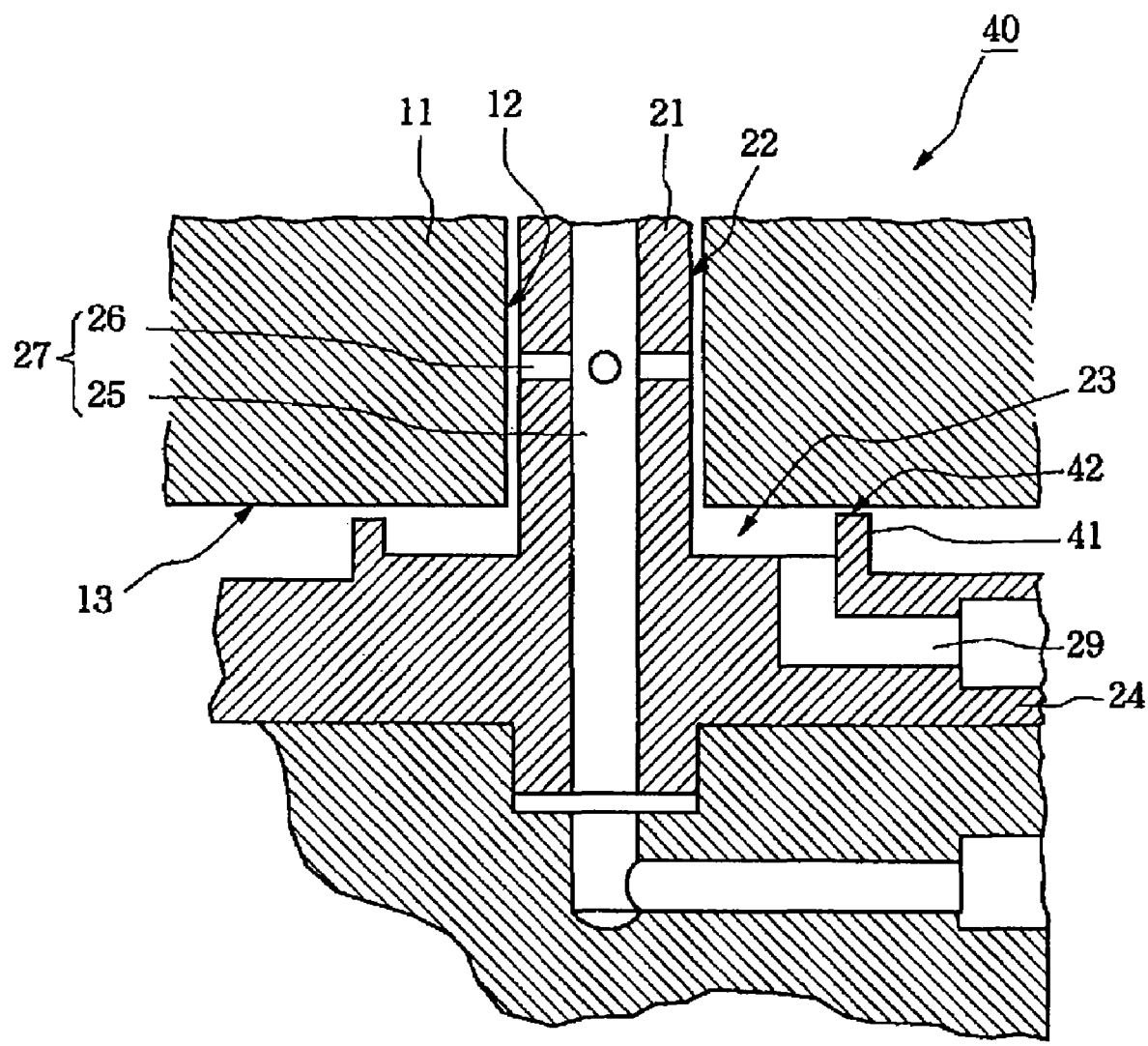
FIG. 6 is an enlarged sectional view of another embodiment of the rotatably supporting device for correcting the balance of the rotating body in accordance with the present invention.

Next, a description will be given of a rotatably supporting device 40 in accordance with another embodiment shown in FIG. 6.

In the rotatably supporting device 40, in order to hold the fluid between the plate 24 of the thrust supporting part 23 and the bottom part 13 of the rotating body 11 so as to secure the pressure, an annular throttle portion 41 protruding toward the bottom part 13 of the rotating body 11 from an upper surface of the outer periphery of the plate 24 is formed, instead of the annular groove, and a gap 42 between the throttle portion 41 and the bottom part 13 of the rotating body 11 is made small, whereby the fluid is prevented from flowing out from the outer peripheral end portion of the plate 24, and a larger gap in comparison with the gap 42 of the throttle portion 41 is secured in an inner peripheral side of the throttle portion 41.

Further, in the rotatably supporting device 40, a second fluid supply passage 29 is provided so as to be open on an upper surface of the plate 24, and the fluid is let out to the portion between the plate 24 and the bottom part 13 of the rotating body 11. However, the fluid supply by the second fluid supply passage 29 may be omitted.

In this case, the other structures of the rotatably supporting device 40 are the same as those of the rotatably supporting device 20, which has been already described.

In accordance with the rotatably supporting device 40 structured in the manner mentioned above, the fluid is let out to the portion between the bottom part 13 of the rotating body 11 and the plate 24 from the second fluid supply passage 29, the outflow fluid is held by the small gap 42 in the annular throttle portion 41 forming the annular dam, and the fluid flowing out from the outflow hole 26 of the journal supporting part 22 is held between the bottom part 13 of the rotating body 11 and the plate 24, whereby it is possible to secure the pressure necessary for floating the rotating body 11.

In the case that the fluid from the journal supporting part 22 is constituted by the air, a nozzle effect is generated when the compressed air flows into the gap of the plate 24 before the rotating body 11 floats. However, the gap is closed by the annular throttle portion 41, and the negative pressure is generated for a very short time. Accordingly, the negative pressure hardly affects the floating of the rotating body 11. Further, the negative pressure is generated by the nozzle effect generated by the throttle portion 41 in an outer peripheral end of the plate 24. However, The area facing to the bottom part 13 of the rotating body 11 is very small, and is hardly affected thereby.

Accordingly, it is possible to float the rotating body 11 even if the rotating body 11 is heavy, it is possible to float the rotating body 11 more widely than the gap between the mandrel 21 of the journal supporting part 22 and the rotation support part 12 of the rotating body 11, it is possible to rotate the rotating body 11 along the mandrel 21, and it is possible to measure a correct unbalance amount.

Next, a description will be given of a rotatably supporting device 50 in accordance with another embodiment shown in FIG. 7.

In the rotatably supporting device 50, in order to hold the fluid between the plate 24 of the thrust supporting part 23 and the bottom part 13 of the rotating body 11 so as to secure the pressure, the second fluid supply passage 29 is structured such as to be provided with a plurality of openings 51 open on the upper surface of the plate 24, instead of the annular groove, and the fluid is let out from each of the opening 51.

Figure 7:
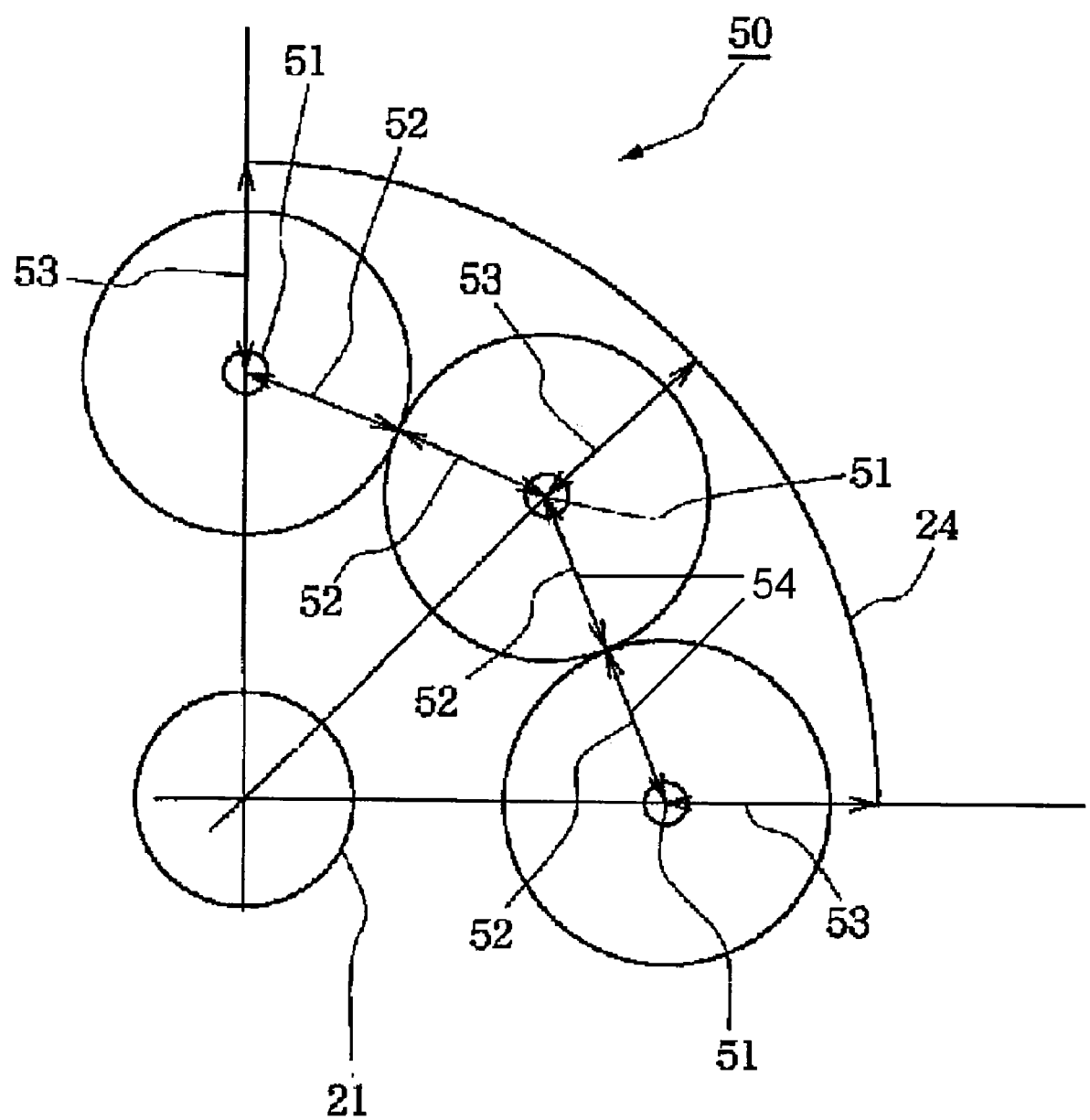
FIG. 7 is an enlarged plan view of a part of the embodiment of the rotatably supporting device for correcting the balance of the rotating body in accordance with the present invention.

In this case, as shown in FIG. 7, a number and an arrangement of the opening 51 are set in such a manner that a half distance 52, which is half of a first distance 54 that extends between centers of the openings 51, is smaller than a second distance 53 that extends from the center of the opening 51 to the outer peripheral end of the plate 24. For example, eight openings 51 are arranged at a uniform interval in the circumference as shown in FIG. 7. Thereby, the half distance 52 between the centers is smaller than the distance 53.

In this case, each of the openings 51 is provided with a communication path (not shown in the drawing) in such a manner that the fluid supplied from one position can be distributed and let out.

In this, the other structures of the rotatably supporting device 50 are the same as those of the rotatably supporting device 20, which has been already described.

In accordance with the rotatably supporting device 50 structured in the manner mentioned above, if the fluid is let out to the portion between the bottom part 13 of the rotating body 11 and the plate 24 from a plurality of openings 51 of the second fluid supply passage 29, since the flow path through which the outflow fluid is going to escape toward the outer peripheral end of the plate 24 is longer than the half flow path between the centers of the openings 51 and a flow path resistance thereof is larger, the fluid flowing out toward the portion between the openings 51, and the fluid flowing out from the outflow hole 26 of the journal supporting part 22 are held between the bottom part 13 of the rotating body 11 and the plate 24, and it is possible to secure the pressure necessary for floating the rotating body 11.

Accordingly, it is possible to float the rotating body 11 even if the rotating body 11 is heavy, it is possible to float the rotating body 11 more widely than the gap between the mandrel 21 of the journal supporting part 22 and the rotation support part 12 of the rotating body 11, it is possible to rotate the rotating body 11 along the mandrel 21, and it is possible to measure a correct unbalance amount.

In this case, in each of the embodiments mentioned above, the description is given of the fluid for floating the journal supporting part and the thrust supporting part by exemplifying the case of using the compressive air, however, it is possible to employ compressive fluid other than the air or a non-compressive fluid such as water, a lubricating oil or the like.

Further, it is possible to limit a used amount of the lubricating oil by floating the rotating body by structuring such as to switch the fluid for floating to be supplied to the journal supporting part and the thrust supporting part via the switching mechanism, in a manner of using the non-compressive fluid such as the lubricating oil or the like for floating the rotating body, and thereafter supplying the compressive fluid such as the air or the like. Thereby, it is possible to blow away the lubricating oil attached to the rotating body to perform cleaning.

Further, since the structure is made such as to switch the fluid for floating to be supplied to the journal supporting part and the thrust supporting part via the switching mechanism, with respect to the rotating bodies having different weights, it is possible to secure a floating amount in correspondence to the characteristics of the compressive fluid and the non-compressive fluid, by employing the compressive fluid for the light rotating body and employing the non-compressive fluid for the heavy rotating body, while using the same mandrel.

As mentioned above, in accordance with the rotatably supporting device 20 of the present invention, in the rotatably supporting device for correcting the balance of the rotating body 11, which is provided in the balance correcting device measuring an unbalance force and rotatably supporting the rotating body 11, since the structure is made such that the device is provided with the journal supporting part 22 provided with the mandrel 21 rotatably supporting the rotating body 11 in the floating state around the vertical axis, the thrust supporting part 23 rotatably supporting the bottom part 13 of the rotating body 11 is provided in the lower end portion of the mandrel 21, the first fluid supply passage 27 supplying the fluid for floating and constituted by the center flow path 25 and the outflow holes 26 is provided between the mandrel 21 and the rotation support hole 12 of the rotating body 11, the annular groove 28 is provided in the thrust supporting part 23 facing to the bottom part 13 of the rotating body 11, and the second fluid supply passage 29 supplying the fluid for floating the rotating body is provided so as to be communicated with the annular groove 28, the rotating body 11 is rotatably supported by the separated journal supporting part 22 and the thrust supporting part 23, it is possible to sufficiently fill the fluid in the inner peripheral side of the annular groove 28 by letting out the fluid from the annular groove 28 provided in the thrust supporting part 23, it is possible to float the rotating body 11 while supporting if the rotating body 11 is heavy, and it is possible to correct the balance by stably rotating along the journal supporting part 22 while securing a sufficient floating amount.

Further, in accordance with the rotatably supporting device 30 of the present invention, since the structure is made such that the annular projection portion 31 forming the smaller gap 32 than the gap between the lower surface of the bottom part 13 of the rotating body 11 and the upper surface of the thrust supporting part 23 is provided in the outer peripheral portion of the thrust supporting part 23 or the rotating body 11, instead of the annular groove 28, and the second fluid supply passage 29 is provided so as to be open on the thrust supporting part 23, it is possible to arrange the annular projection portion 31 in the outer peripheral portion of the thrust supporting part 23 or the rotating body 11 so as to form the small gap 32, it is possible to sufficiently fill the fluid while preventing the fluid supplied to the thrust supporting part 23 from the second fluid supply passage 29 from flowing out to the outer peripheral portion, and it is possible to stably rotate along the journal supporting part 22 while securing the sufficient floating amount, by floating the rotating body 11 while supporting the weight thereof even if the rotating body 11 is heavy.

Further, in accordance with the rotatably supporting device 40 of the present invention, since the structure is made such that the annular throttle portion 41 forming the smaller gap 42 than the gap between the lower surface of the bottom part 13 of the rotating body 11 and an upper surface of the thrust supporting part 23 is provided in any one of the surface of the thrust supporting part 23 and the surface of the rotating body 11 facing each other, instead of the annular groove 28, it is possible to secure a relatively large gap 42 in an inner peripheral side of the throttle portion 41 by arranging the annular throttle portion 41 in any one of the facing surfaces to the thrust supporting part 23 and the rotating body 11 so as to form the small gap 42, it is possible to float the rotating body 11 while supporting the weight thereof even if the rotating body 11 is heavy, by sufficiently filling the fluid on the thrust supporting part 23 while preventing the fluid from flowing out to the outer peripheral portion, and it is possible to correct the balance by stably rotating along the journal supporting part 22 while securing the sufficient floating amount.

Further, in accordance with the rotatably supporting device 40 of the present invention, since the structure is made such that the throttle portion 41 is provided, and the second fluid supply passage 29 is provided so as to be open on the thrust supporting part 23, it is possible to prevent the fluid from flowing out to the outer peripheral portion by supplying the fluid to the inner peripheral side of the throttle portion 41 from the second fluid supply passage 29, it is possible to more securely fill the sufficient fluid on the thrust supporting part 23, it is possible to float the rotating body 11 while supporting the weight thereof even if the rotating body 11 is heavy, and it is possible to correct the balance by stably rotating along the journal supporting part 22 while securing the sufficient floating amount.

Further, in accordance with the rotatably supporting device 50 of the present invention, since the structure is made such that a plurality of openings 51 are provided in the second fluid supply passage 29 open on the thrust supporting part 23, instead of the annular groove 28, and the openings 51 are provided in such a manner that the half distance 52 between the adjacent opening centers becomes smaller than the distance 53 from each of the centers of the openings 51 to the outer peripheral opening end, it is possible to sufficiently fill the fluid on the thrust supporting part 23 by increasing a flow path resistance to an outer peripheral side on the basis of an arrangement of the openings 51 of the second fluid flow path 29 open on the thrust supporting part 23 while preventing the fluid from flowing out to the outer peripheral portion, it is possible to correct the balance by stably rotating along the journal supporting part 22 while securing the sufficient floating amount by floating the rotating body 11 while supporting the weight thereof even if the rotating body 11 is heavy.

Next, a description will be given of some embodiments of the rotatably supporting device for correcting the balance of the rotating body in accordance with the present invention particularly using the non-compressive fluid such as the lubricating oil or the like.

Figure 8:
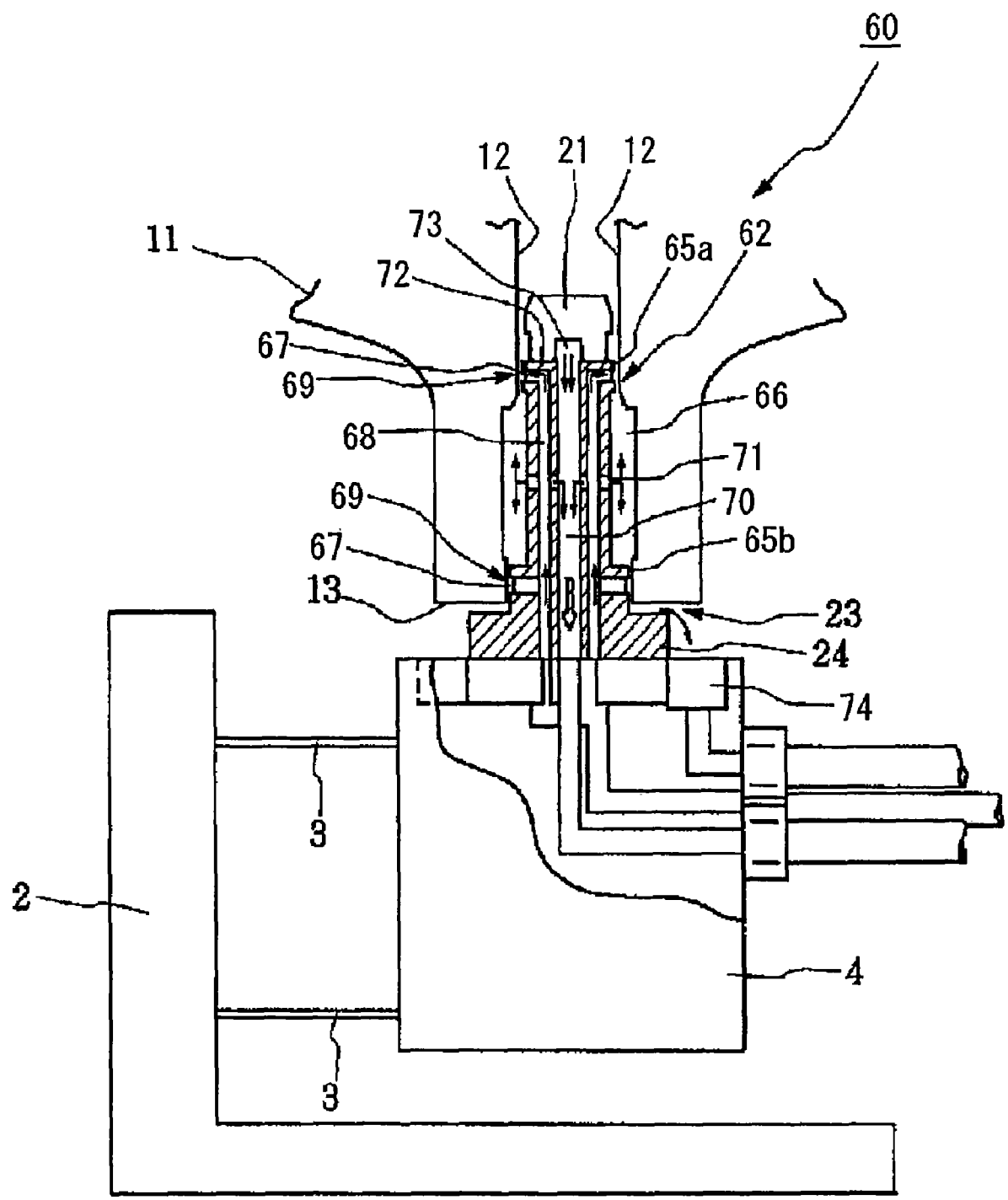
FIG. 8 is a partially cut schematic view of a part of another embodiment of the rotatably supporting device for correcting the balance of the rotating body in accordance with the present invention.
Figure 9:
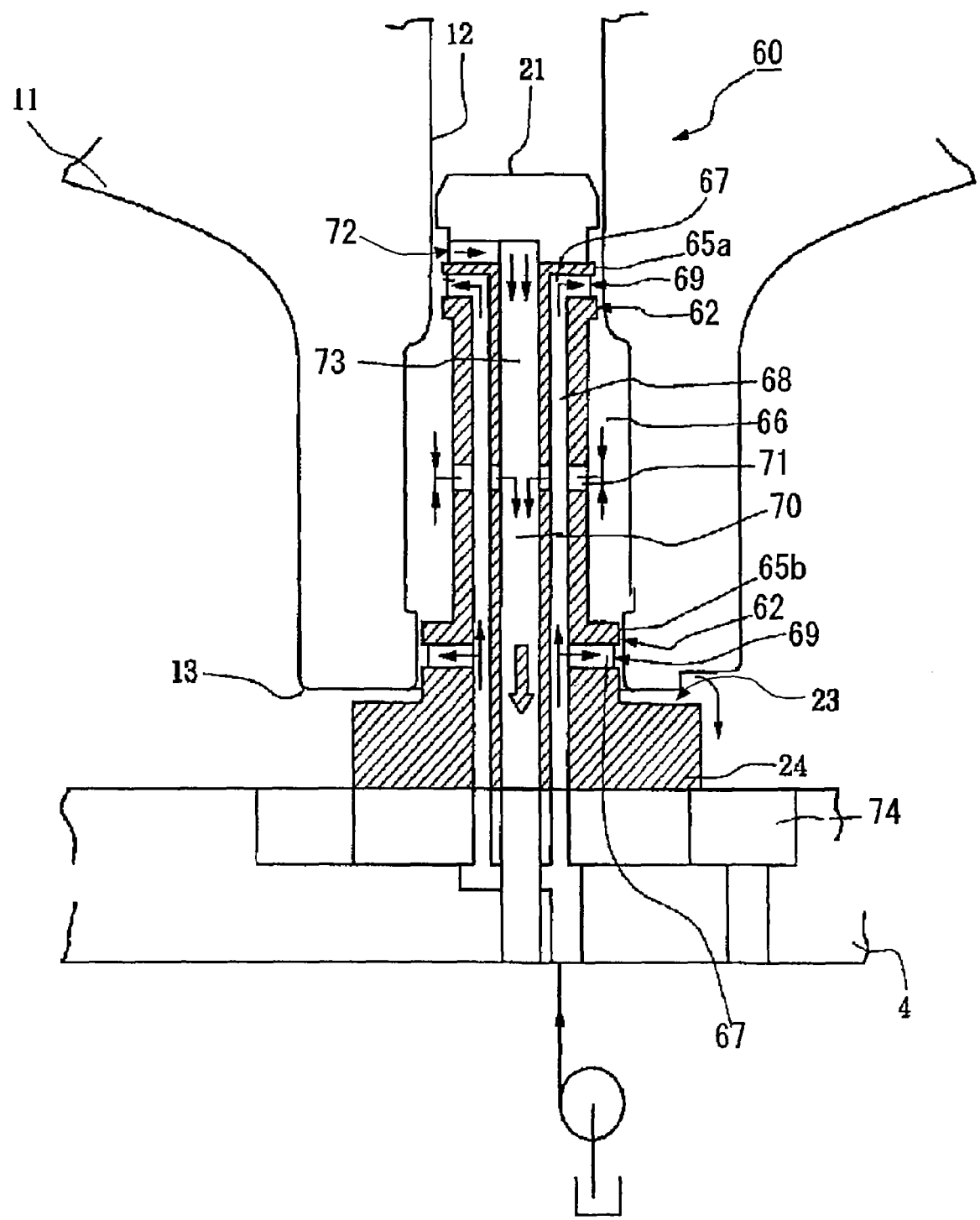
FIG. 9 is an enlarged sectional view of the embodiment of the rotatably supporting device for correcting the balance of the rotating body in accordance with the present invention.

FIGS. 8 and 9 relate to an embodiment of a rotatably supporting device for correcting a balance of a rotating body in accordance with the present invention, in which FIG. 8 is a partially cut schematic view showing, FIG. 9 is a partly enlarged sectional view.

A rotatably supporting device 60 for correcting a balance of a rotating body (hereinafter, refer simply to as a rotatably supporting device 60) corresponds to a rotatably supporting device for correcting a balance which is provided in a balance correcting device measuring an unbalance force and rotating the rotating body while rotatably supporting, which is provided, for example, instead of the support journal 5 and the plate 8 provided in the vibration bridge 4 of the balance correcting device 1 described in FIGS. 1A and 1B, thereby rotatably supporting the rotating body 11 in a floating state even if the rotating body 11 is heavy or large.

The rotatably supporting device 60 is provided with a journal supporting part 62 having a mandrel 21 rotatably supporting the rotating body 11 around a vertical axis in a floating state, the lower end portion of the mandrel 21 is integrally provided with the disc-shaped plate 24 constituting the thrust supporting part 23 rotatably supporting a bottom part 13 of the rotating body 11 in a floating state, and the plate 24 is fixed to the vibration bridge 4.

In the rotatably supporting device 60, supporting portions 65a and 65b are provided in upper and lower sides of the journal supporting part 62 rotatably supporting the rotating body 11 around the vertical axis while installing the rotation support hole 12 of the rotating body 11 to the mandrel 21, and the other portions are formed at a small diameter, whereby the structure is made such that a first space part 66 is formed between the upper and lower supporting portions 65a and 65b if the rotation support hole 12 of the rotating body 11 is installed.

In this case, in order to form the first space part 66, the structure is not limited to the case that the other portions than the upper and lower supporting portions 65a and 65b of the mandrel 21 are formed at the small diameter, but the first space part 66 may be formed by making the inner diameter portion of the rotation support hole 12 of the rotating body 11 at the large diameter, or may be formed by combining them. Further, the supporting portions are not limited to be arranged at two upper and lower positions, but may be increased in number.

A plurality of outflow holes 67 open on the outer periphery of the mandrel 21 are formed horizontally in the upper and lower supporting portions 65a and 65b of the mandrel 21, are communicated with an annular first fluid supply passage 68 in an outer side formed doubly along the center axis of the mandrel 21, and are structured such that the non-compressive fluid for floating, for example, the lubricating oil is supplied thereto.

Further, in the rotatably supporting device 60, an annular groove 69 is formed so as to communicate leading end portions of outflow holes 67 of the upper and lower supporting portions 65a and 65b, whereby it is possible to uniformly supply the non-compressive fluid to the periphery. In this case, the annular groove 69 may be omitted.

Accordingly, when letting out the lubricating oil supplied to the first fluid supply passage 68 in the outer peripheral side in the doubly flow path from the outflow hole 67 and the annular groove 69 so as to supply it to the supporting portions 65a and 65b between the mandrel 21 and the rotation support hole 12 of the rotating body 11, the rotating body 11 is in a state in which the rotating body 11 is supported rotatably around the vertical axis in a non-contact state with the mandrel 21 via the slight gap on the basis of the pressure of the lubricating oil of the non-compressive fluid.

On the other hand, in the rotatably supporting device 60, the structure is made such that the non-compressive fluid supplied to the journal supporting part 62 flows into the portion between the disc-shaped plate 24 constituting the thrust supporting part 23 and the bottom part 13 of the rotating body 11 so as to rotatably support the rotating body 11.

The structure is made such that the non-compressive fluid flows to the thrust supporting part 23 from the journal supporting part 62 as mentioned above, however, the rapid volume expansion is not generated as is different from the case of the compressive fluid, the negative pressure on the basis of the nozzle effect is not generated, and the rotating body 11 is floated on the plate 24 on the basis of the pressure of the lubricating oil of the non-compressive fluid, whereby it is possible to obtain a predetermined floating amount which is larger than the gap of the journal supporting part 62.

Further, in the rotatably supporting device 60, a discharge path 70 is provided in the center portion of the mandrel 21 for discharging the non-compressive fluid supplied to the first space part 66 between the upper and lower supporting portions 65a and 65b of the journal supporting part 62 and is communicated with the first space part 66 by a communication hole 71 so as to discharge to the external portion.

Accordingly, it is possible to increase rigidity by making the pressure on the supporting portions 65a and 65b higher than the first space part 66, and it is possible to rotate the rotating body 11 along the center axis of the mandrel 21.

In the same manner, in order to discharge the non-compressive fluid flowing out to an upper side from the upper supporting portion 65a, a communication hole 72 is formed in an upper side of the upper supporting portion 65a, and a second discharge path 73 is extended to an upper side so as to function also as the discharge path 70.

Therefore, it is possible to prevent the influence of the pressure of the lubricating oil in the upper side of the supporting portion 65a from making the rotating body 11 eccentric, and it is possible to prevent the lubricating oil from being scattered in the case that the rotation support hole 12 of the rotating body 11 is constituted by a through hole.

Further, in the rotatably supporting device 60, since the non-compressive fluid flowing into the thrust supporting part 23 leaks out of the outer peripheral portion of the plate 24, a recovery groove 74 is annularly provided as recovery means for recovering the fluid.

Accordingly, it is possible to recover the lubricating oil so as to use in a circulating manner, and it is possible to prevent the lubricating oil from being scattered to the periphery.

In the rotatably supporting device 60 structured in the manner mentioned above, the rotating body 11 is installed in such a manner that the rotation support hole 12 of the rotating body 1 is inserted to the mandrel 21 of the journal supporting part 62.

Further, the rotation support part 12 of the rotating body 11 is supported in a floating state to the mandrel 21 in the fixed state, by supplying the lubricating oil as the non-compressive fluid to the first fluid supply passage 68, and letting out the non-compressive fluid from the annular groove 69 via the upper and lower outflow holes 67 of the mandrel 21.

In the same manner, a part of the lubricating oil flows as the non-compressive fluid supplied to the journal supporting part 62 via the first fluid supply passage 68 to the thrust supporting part 23, the pressure is held between the upper surface of the plate 24 and the bottom part of the rotating body 11, and it is possible to support the rotating body 11 in the floating state. Further, the lubricating oil leaking to the outer periphery of the plate 24 flows into the recovery groove 74 so as to be recovered and is used in a circulating manner.

It is possible to execute the balance test while measuring the unbalance force transmitted to the vibration bridge 4 by rotating the rotating body 11 in this state.

In the rotatably supporting device 60 mentioned above, since the volume expansion is not generated as is different from the case of using the compressive fluid, the negative pressure portion on the basis of the nozzle effect is not generated in the non-compressive fluid flowing out to the thrust supporting part 23 from the outflow hole 67 and the annular groove 69 in the journal supporting part 62, and it is possible to secure a pressure necessary for floating the rotating body 11 by the pressure of the lubricating oil even if the rotating body 11 is heavy.

Accordingly, it is possible to sufficiently float the rotating body 11 even if the rotating body 11 is heavy, it is possible to measure a correct unbalance amount by floating the rotating body 11 more widely than the gap between the mandrel 21 of the journal supporting part 62 and the rotation support part 12 of the rotating body 11, and rotating the rotating body 11 along the mandrel 21.

In other words, it is possible to prevent the rotating body 11 from rotating on the plate 24 on the basis of the bottom part 13 of the rotating body 11, it is possible to rotate the rotating body 11 in a state in which geometric axes of the rotation support part 12 of the rotating body 11 and the outer periphery of the mandrel 21 coincide with each other at a sufficient precision, and it is possible to obtain a right balance correcting precision.

Next, a description will be given of another embodiment in accordance with the present invention with reference to FIG. 10.

In a rotatably supporting device 80, the structure is made such that the non-compressive fluid is directly supplied to the portion between the plate 24 of the thrust supporting part 23 and the bottom part 13 of the rotating body 11 independently from the journal supporting part 62, and a second fluid supply passage 81 is provided so as to be open on the upper surface of the plate 24 so as to divergently supply a part of the non-compressive fluid, for example, the lubricating oil supplied to the journal supporting part 62.

Accordingly, it is possible to more securely hold the pressure generated by the non-compressive fluid between the plate 24 and the bottom part 13 of the rotating body 11, and it is possible to more securely float the rotating body 11.

Figure 10:
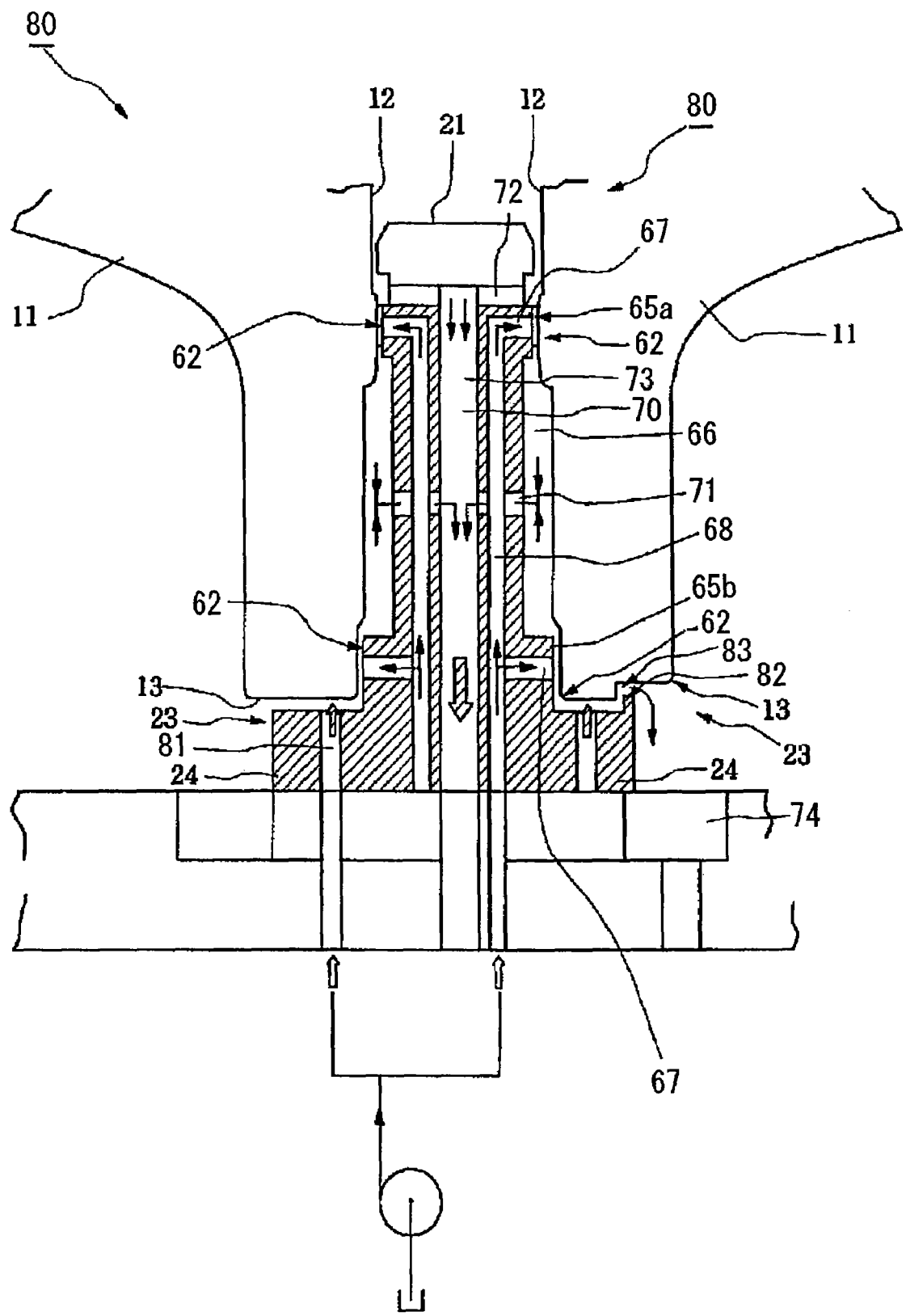
FIG. 10 is an enlarged sectional view of another embodiment of the rotatably supporting device for correcting the balance of the rotating body in accordance with the present invention, and shows different aspects in right and left half portions, respectively.

Further, in the rotatably supporting device 80, as shown in a right half portion of FIG. 10, in order to hold the non-compressive fluid from the second fluid supply passage 81 so as to secure the pressure, an annular protruding portion 82 may be formed as a dam protruding toward an outer periphery of the bottom part 13 of the rotating body 11 from the outer peripheral portion of the plate 24, and a gap 83 between the protruding portion 82 and the outer periphery of the rotating body 11 may be made small, whereby the non-compressive fluid is prevented from flowing out from the outer peripheral end portion of the plate 24 and the pressure can be held.

In this case, the other structures of the rotatably supporting device 80 are the same as those of the rotatably supporting device 60, which has been already described.

In accordance with the rotatably supporting device 80 structured in the manner mentioned above, the non-compressive fluid is let out to the portion between the bottom part 13 of the rotating body 11 and the plate 24 from the second fluid supply passage 81, the compressive fluid flowing out from the outflow hole 67 of the journal supporting part 62 and the non-compressive fluid flowing out from the second fluid supply passage 81 are held between the bottom part 13 of the rotating body 11 and the plate 24, whereby it is possible to more securely hold the pressure necessary for floating the rotating body 11.

Accordingly, it is possible to prevent the rotating body 11 from rotating on the plate 24 on the basis of the bottom part 13 of the rotating body 11, it is possible to rotate the rotating body 11 in a state in which the geometric axes of the rotation support part 12 of the rotating body 11 and the outer periphery of the mandrel 21 coincide with each other at a sufficient precision, and it is possible to obtain a right balance correcting precision.

Further, in the rotatably supporting device 80, since the annular protruding portion 82 is formed as the dam protruding toward the outer periphery of the bottom part 13 of the rotating body 11 from the outer peripheral portion of the plate 24, the gap 83 between the protruding portion 82 and the outer periphery of the rotating body 11 is small, whereby the non-compressive fluid is prevented from flowing out from the outer peripheral end portion of the plate 24 and the pressure can be more securely held. Further, it is possible to rotate the rotating body 11 in a state in which the geometric axes of the rotation support part 12 of the rotating body 11 and the outer periphery of the mandrel 21 coincide with each other at the sufficient precision while preventing the rotating body 11 from rotating on the plate 24 on the basis of the bottom part 13 even if the rotating body 11 is heavy, and it is possible to obtain a right balance correcting precision.

Figure 11:
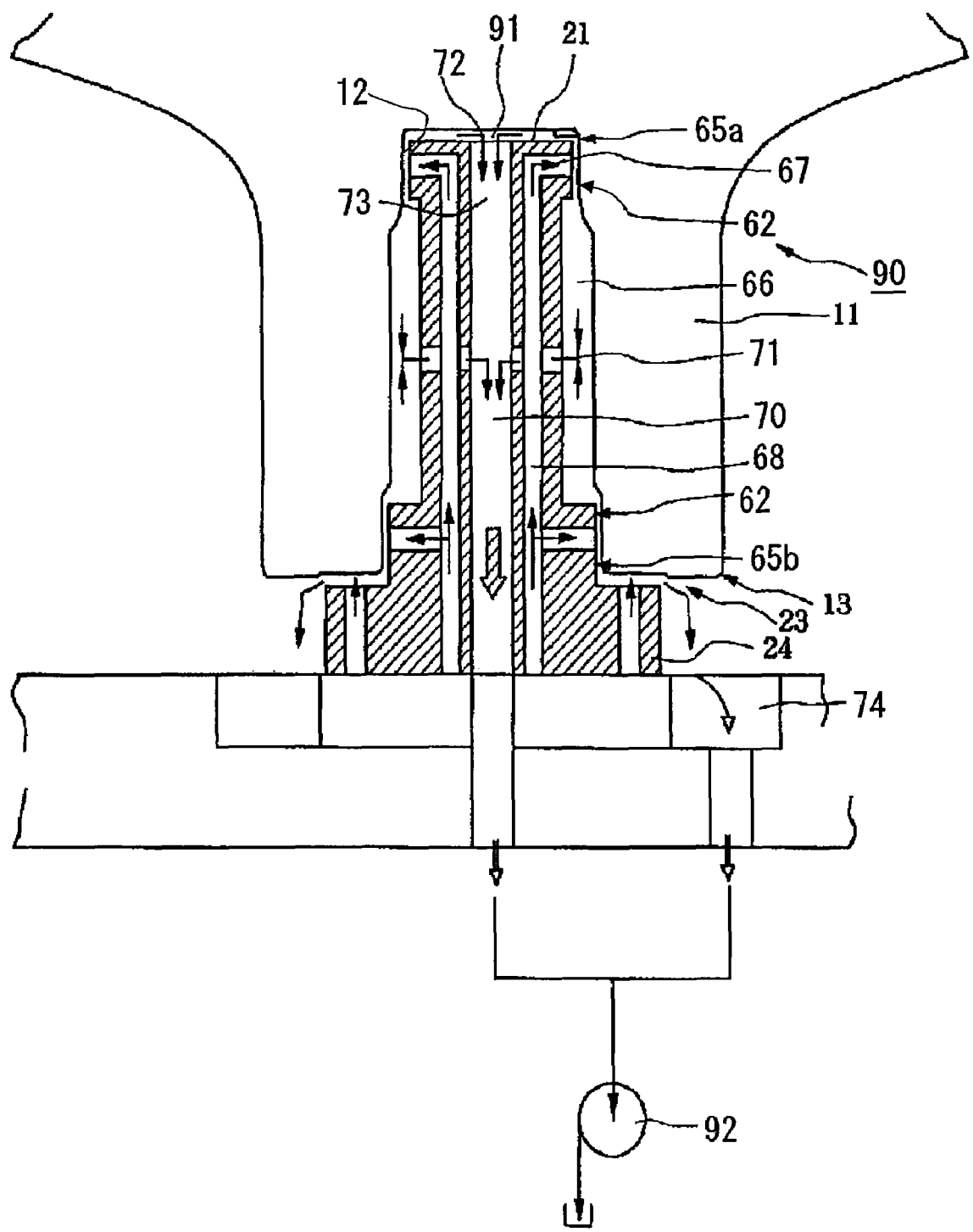
FIG. 11 is an enlarged cross sectional view of another embodiment of the rotatably supporting device for correcting the balance of the rotating body in accordance with the present invention.

Next, a description will be given of a rotatably supporting device 90 in accordance with another embodiment shown in FIG. 11.

The rotatably supporting device 90 corresponds to a case that the rotation support part 12 of the rotating body 11 is not constituted by the through hole, but is constituted by a closed-end hole. Since the non-compressive fluid supplied to the journal supporting part 62 stays in the top portion of the mandrel 21, an opening 91 in an upper end of the communication hole 72 is arranged in a top portion corresponding to the upper side of the top supporting portion 65a, and the structure is made such that the non-compressive fluid can be discharged to the external portion from the second discharge path 73 and the discharge path 70 of the first space part 66 communicating with each other.

Accordingly, since the non-compressive fluid supplied to the journal supporting part 62 stays in the top portion of the mandrel 21 and the bottom part of the rotation support part 12, a floating force is generated in this portion, it is possible to limit the influence that the rotating body 11 is eccentric or the like, it is possible to rotate the rotating body 11 in a state in which the geometric axes of the rotation support part 12 of the rotating body 11 and the outer periphery of the mandrel 21 coincide with each other at the sufficient precision, and it is possible to obtain a right balance correcting precision.

Further, in the rotatably supporting device 90, a pump 92 serving as discharge means is connected for forcibly discharging the non-compressive fluid to the discharge path 70 discharging the non-compressive fluid from the first space part 66 and the second discharge path 73 discharging the non-compressive fluid from the top portion.

Accordingly, it is possible to forcibly suck and discharge the non-compressive fluid stored in the first space part 66, the bottom part of the rotation support part 12 of the rotating body 11, and the top portion of the mandrel 21, the influence on the basis of the pressure of the non-compressive fluid is not applied to these portions, and it is possible to prevent the rotating body 11 from being eccentric.

In this case, the other structures of the rotatably supporting device 90 are the same as those of the rotatably supporting device 60, which has been already described.

In accordance with the rotatably supporting device 90 structured in the manner mentioned above, it is possible to float the rotating body 11 while doing away with the influence of the eccentricity or the like caused by the non-compressive fluid even if the rotating body 11 is heavy, it is possible to float the rotating body 11 more widely than the gap between the mandrel 21 of the journal supporting part 62 and the rotation support part 12 of the rotating body 11, it is possible to rotate the rotating body 11 along the mandrel 21, and it is possible to measure the correct unbalance amount.

As is described above together with each of the embodiments, in accordance with the rotatably supporting device 60 of the present invention, in the rotatably supporting device 60 for correcting the balance of the rotating body 11, which is provided in the balance correcting device 1 measuring an unbalance force and rotatably supporting the rotating body. Since the structure is made such that the device is provided with the journal supporting part 62 provided with the mandrel 21 rotatably supporting the rotating body 11 in the floating state around the vertical axis, the thrust supporting part 23 rotatably supporting the bottom part 13 of the rotating body 11 is provided in the lower end portion of the mandrel 21, the fluid supply passage 68 is provided for supplying the non-compressive fluid for floating between the mandrel 21 and the rotation support hole 12 of the rotating body 11, and the first space part 66 widening a space other than a second space part at the supporting portions 65a and 65b is provided in at least any one of the mandrel 21 and the rotation support hole 12, the rotating body 11 is rotatably supported by the separated journal supporting part 62 and the thrust supporting part 23, the non-compressive fluid from the fluid supply passage 68 is let out to the thrust supporting part 23, it is possible to float the rotating body 11 while supporting it even if the rotating body 11 is heavy, it is possible to secure the sufficient floating amount by arranging the first space part 66 in the journal supporting part 62 except the supporting portions 65a and 65b so as to apply the non-compressive fluid supplied from the fluid supply passage 68 only to the supporting portions 65a and 65b for rotatably supporting the rotating body 11, and it is possible to stably rotate the rotating body 11 while preventing an eccentricity while increasing a rigidity in the journal supporting part 62.

Further, in accordance with the rotatably supporting device 60, since the structure is made such that the device is provided with the discharge path 70 communicated with the first space part 66 so as to discharge the non-compressive fluid in the inner portion thereof, it is possible to further apply the non-compressive fluid only to the supporting portions 65a and 65b for rotatably supporting the rotating body 11, by discharging the non-compressive fluid in the first space part 66 from the discharge path 70, and it is possible to stably rotate the rotating body 11 while increasing the rigidity in the journal supporting part 62 so as to prevent the eccentricity.

Further, in accordance with the rotatably supporting device 80 of the present invention, since the structure is made such that the annular projection portion 82 holding the non-compressive fluid is provided between the thrust supporting part 23 and the rotating body 11, it is possible to more securely hold the non-compressive fluid on the thrust supporting part 23, and it is possible to correct the balance while securely floating the rotating body 11 even if the rotating body 11 is heavy.

Further, in accordance with the rotatably supporting device 80 of the present invention, since the structure is made such that the annular groove 69 is provided in the leading end portion of the second fluid supply passage 81 of the journal supporting part 62, it is possible to let out the non-compressive fluid to an entire periphery of the journal supporting part 62 from the annular groove 69, and it is possible to correct the balance by more securely rotating along the journal supporting part 62 while preventing the eccentricity or the like.

Further, in accordance with the rotatably supporting device 80 of the present invention, since the structure is made such that the second fluid supply passage 81 supplying the non-compressive fluid for floating the rotating body is provided in the thrust supporting part 23 facing to the bottom part 13 of the rotating body 11, it is possible to more securely supply the non-compressive fluid to the thrust supporting part 23, and it is possible to stably rotate while increasing the rigidity in the journal supporting part 62 so as to prevent the eccentricity.

Further, in accordance with the rotatably supporting device 90 of the present invention, since the structure is made such that the second discharge path 73 discharging the non-compressive fluid is provided by positioning the opening 91 in the upper side of the topmost supporting portion 65a between the mandrel 21 and the rotation support hole 12, it is possible to discharge the non-compressive fluid flowing out to the upper side of the topmost supporting portion from the communication hole 72 and the second discharge path 73, it is possible to discharge the non-compressive fluid from the opening 91 even in the case that the rotation support hole 12 of the rotating body 11 has a bottom and does not penetrate, and it is possible to prevent the scattering and the leaking so as to correct the balance in the case that it penetrates.

Further, in accordance with the rotatably supporting device 90 of the present invention, since the structure is made such that the pump 92 is provided as the discharge means for forcibly discharging the non-compressive fluid in the discharge path 70 and/or the second discharge path 73, it is possible to supply the non-compressive fluid only to the necessary portion so as to rotatably support by arranging the pump 92 serving as the discharge means at the discharge path 70 and the second discharge path 73 so as to forcibly discharge the non-compressive fluid, and it is possible to correct the balance while preventing the scattering and the leaking.

Further, in accordance with the rotatably supporting device 90 of the present invention, since the structure is made such that the recovery groove 74 serving as the recovery means for recovering the non-compressive fluid is provided so as to face to the outer periphery of the thrust supporting part 23, it is possible to recover the non-compressive fluid from the thrust supporting part 23 by the recovery groove 74 of the recovery means, and it is possible to correct the balance while preventing the scattering and the leaking.

In this case, the description is given of the rotatably supporting device in accordance with the present invention on the basis of the preferable embodiments, however, it can be understood that the scope of the present invention is not limited to the embodiments. On the contrary, the scope of the present invention includes all the improvements, modifications and equivalents contained in the attached claims.

The invention claimed is:

1. A device for correcting balance of a rotating body, comprising:
   a journal supporting part having a mandrel that rotatably supports the rotating body in a floating state about a vertical axis;
   a thrust supporting part that is provided at a lower end portion of the mandrel and supports a bottom part of the rotating body in the floating state;
   a first fluid supply passage that supplies fluid for floating to a rotation support hole of the rotating body; and
   a second fluid supply passage to supply fluid for floating the rotating body,
   wherein the second fluid supply passage opens at a plurality of openings on the thrust supporting part,
   wherein a first distance extends between centers of adjacent openings of the second fluid supply passage, and a second distance extends from a center of each of the openings to an outer peripheral end of the thrust supporting part, and wherein half of the first distance is smaller than the second distance.

2. A device for correcting balance of a rotating body, comprising:
   a journal supporting part having a mandrel that rotatably supports the rotating body in a floating state about a vertical axis;
   a thrust supporting part that is provided at a lower end portion of the mandrel and supports a bottom part of the rotating body in the floating state;
   a first fluid supply passage that supplies fluid for floating to a rotation support hole of the rotating body;
   an annular groove provided in the thrust supporting part so as to face the bottom part of the rotating body;
   a second fluid supply passage that communicates with the annular groove to supply fluid for floating the rotating body; and
   a configuration to switch the fluid supplied to either of the first fluid supply passage or the second fluid supply passage, or both the first and second fluid supply passages, between a compressive fluid and a non-compressive fluid.

3. A device for correcting balance of a rotating body, comprising:
   a journal supporting part having a mandrel that rotatably supports the rotating body in a floating state about a vertical axis;
   a thrust supporting part that is provided at a lower end portion of the mandrel and supports a bottom part of the rotating body in the floating state; and
   a fluid supply passage that supplies fluid for floating to a rotation support hole of the rotating body;
   wherein a first space part and a second space part are formed in at least either one of the mandrel and the rotation support hole,
   wherein the first space part is wider in a radial direction of the rotating body than the second space part, the first space part extends in the radial direction from an outer circumferential surface of the mandrel where supporting portions of the journal supporting part are not positioned to an inner circumferential surface of the rotating body, and the second space part extends in the radial direction from the outer circumferential surface of the mandrel where supporting portions of the journal supporting part are positioned to the inner circumferential surface of the rotating body.

4. A device according to claim 3, wherein the supporting portions are provided at lower and upper positions of the journal supporting part, respectively, and the first space part extends between the supporting portions at the lower and upper positions of the journal supporting part.

5. A device according to claim 4, wherein a second fluid supply passage is provided for supplying fluid for floating the rotating body to the thrust supporting part facing the bottom part of the rotating body.

6. A device according to claim 4, wherein a discharge path communicated with the first space part is provided for discharging the fluid.

7. A device according to claim 6, wherein discharge means for forcibly discharging the fluid is provided at the discharge path.

8. A device according to claim 4, wherein for discharging the fluid, a second discharge path is provided to open upward on a topmost supporting portion between the mandrel and the rotation support hole of the rotating body.

9. A device according to claim 8, wherein discharge means for forcibly discharging the fluid is provided at the second discharge path.

10. A device according to claim 4, wherein an annular projection portion is provided between the thrust supporting part and the rotating body, for holding the fluid.

11. A device according to claim 4, wherein an annular groove is provided in a front end portion of the fluid supply passage of the journal supporting part.

12. A device according to claim 3, wherein a second fluid supply passage is provided for supplying fluid for floating the rotating body to the thrust supporting part facing the bottom part of the rotating body.

13. A device according to claim 3, wherein a discharge path communicated with the first space part is provided for discharging the fluid.

14. A device according to claim 13, wherein discharge means for forcibly discharging the fluid is provided at the discharge path.

15. A device according to claim 3, wherein for discharging the fluid, a second discharge path is provided to open upward on a topmost supporting portion between the mandrel and the rotation support hole of the rotating body.

16. A device according to claim 15, wherein discharge means for forcibly discharging the fluid is provided at the second discharge path.

17. A device according to claim 3, wherein an annular projection portion is provided between the thrust supporting part and the rotating body, for holding the fluid.

18. A device according to claim 3, wherein an annular groove is provided in a front end portion of the fluid supply passage of the journal supporting part.

19. A device for correcting balance of a rotating body, comprising:

a journal supporting part having a mandrel that rotatably supports the rotating body in a floating state about a vertical axis;

a thrust supporting part that is provided at a lower end portion of the mandrel and supports a bottom part of the rotating body in the floating state; and a fluid supply passage that supplies fluid for floating to a rotation support hole of the rotating body;

wherein a space part is formed in at least either one of the mandrel and the rotation support hole for widening a space other than at a supporting portion, wherein recovery means for recovering the fluid is provided at a position confronting an outer periphery of the thrust supporting part.

* * * * *